US012745262B2

(12) United States Patent
Bai et al.

(10) Patent No.: US 12,745,262 B2
(45) Date of Patent: Sep. 22, 2026

(54) TECHNIQUES FOR UPDATING TRANSMISSION CONFIGURATION INDICATOR (TCI) STATES IN WIRELESS COMMUNICATIONS

(71) Applicant: QUALCOMM Incorporated, San Diego, CA (US)

(72) Inventors: Tianyang Bai, Mountain View, CA (US); Yan Zhou, San Diego, CA (US); Mostafa Khoshnevisan, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 18/477,078

(22) Filed: Sep. 28, 2023

(65) Prior Publication Data

US 2024/0147494 A1 May 2, 2024

Related U.S. Application Data

(60) Provisional application No. 63/381,281, filed on Oct. 27, 2022.

(51) Int. Cl.
*H04W 72/232* (2023.01)
*H04L 5/00* (2006.01)
*H04W 76/20* (2018.01)

(52) U.S. Cl.
CPC ........... *H04W 72/232* (2023.01); *H04L 5/001* (2013.01); *H04W 76/20* (2018.02)

(58) Field of Classification Search
CPC ...... H04W 72/232; H04W 76/20; H04L 5/001
See application file for complete search history.

(56) References Cited

U.S. PATENT DOCUMENTS 12,294,871 B2 * 5/2025 Noh ...................... H04W 16/26
12,470,356 B2 * 11/2025 Farag .................... H04L 5/0007
12,563,543 B2 * 2/2026 Farag .................... H04L 1/1848
2022/0217751 A1 * 7/2022 Zhou ..................... H04L 5/0048
(Continued)

FOREIGN PATENT DOCUMENTS

WO WO-2022173262 A1 * 8/2022 ......... H04B 7/06952
WO 2022212308 A1 10/2022

OTHER PUBLICATIONS

International Search Report and Written Opinion—PCT/US2023/075576—ISA/EPO—Feb. 7, 2024.
(Continued)

*Primary Examiner* — Michael J Moore, Jr.
(74) *Attorney, Agent, or Firm* — ArentFox Schiff, LLP

(57) ABSTRACT

Aspects described herein relate to receiving a first downlink control information (DCI) indicating a first transmission configuration indicator (TCI) state to be applied for a first component carrier (CC) at a first beam applying time (BAT), receiving a second DCI indicating a second TCI state to be applied for the first CC or a second CC at a second BAT, and where the first BAT and the second BAT are within a same time period, applying the first TCI state or the second TCI state for one or more of the first CC or the second CC within the time period based at least in part on a first property of the first DCI and a second property of the second DCI. Other aspects relate to transmitting the DCI. Other aspects relate to when the BATs are not within the same time period.

30 Claims, 13 Drawing Sheets

(56) References Cited

U.S. PATENT DOCUMENTS

| | | | | |
|---|---|---|---|---|
| 2022/0272685 | A1* | 8/2022 | Rahman | H04W 72/046 |
| 2022/0287013 | A1* | 9/2022 | Farag | H04L 5/0035 |
| 2023/0239897 | A1* | 7/2023 | Zhu | H04L 5/0094 370/329 |
| 2024/0008044 | A1* | 1/2024 | Bai | H04L 5/0094 |
| 2024/0040652 | A1* | 2/2024 | Shahmohammadian | H04B 7/022 |
| 2024/0064772 | A1* | 2/2024 | MolavianJazi | H04L 5/0092 |
| 2024/0187178 | A1* | 6/2024 | Matsumura | H04L 5/0091 |
| 2024/0188015 | A1* | 6/2024 | Comsa | H04W 56/0045 |
| 2024/0214173 | A1* | 6/2024 | Matsumura | H04L 5/001 |
| 2024/0340878 | A1* | 10/2024 | Li | H04W 72/04 |
| 2025/0007676 | A1* | 1/2025 | Matsumura | H04L 5/0094 |
| 2025/0089068 | A1* | 3/2025 | Matsumura | H04W 16/28 |
| 2025/0133568 | A1* | 4/2025 | Matsumura | H04W 72/23 |
| 2025/0220453 | A1* | 7/2025 | Noh | H04W 72/046 |
| 2025/0240134 | A1* | 7/2025 | Park | H04L 5/0091 |
| 2025/0287387 | A1* | 9/2025 | Kurita | H04W 72/23 |
| 2025/0337537 | A1* | 10/2025 | Guan | H04L 5/0035 |
| 2025/0344086 | A1* | 11/2025 | Shim | H04J 11/0026 |

OTHER PUBLICATIONS

Nokia, et al., "Maintenance of Enhancements on Multi-Beam Operation", 3GPP TSG RAN WG1 #109-e, R1-2204535, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 25, 2022, 13 Pages, XP052138104, pp. 2-3, Paragraph [02.2], Figure 1.

* cited by examiner

TECHNIQUES FOR UPDATING TRANSMISSION CONFIGURATION INDICATOR (TCI) STATES IN WIRELESS COMMUNICATIONS

CLAIM OF PRIORITY UNDER 35 U.S.C. § 119

The present application for patent claims priority to Provisional Patent Application No. 63/381,281, entitled "TECHNIQUES FOR UPDATING TRANSMISSION CONFIGURATION INDICATOR (TCI) STATES IN WIRELESS COMMUNICATIONS" filed Oct. 27, 2022, which is assigned to the assignee hereof and hereby expressly incorporated by reference herein for all purposes.

FIELD OF THE DISCLOSURE

Aspects of the present disclosure relate generally to wireless communication systems, and more particularly, to techniques for updating transmission configuration indicator (TCI) states.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes receiving a first downlink control information (DCI) indicating a first transmission configuration indicator (TCI) state to be applied for a first component carrier (CC) at a first beam applying time (BAT), receiving a second DCI indicating a second TCI state to be applied for the first CC or a second CC at a second BAT, and where the first BAT and the second BAT are within a same time period, applying the first TCI state or the second TCI state for one or more of the first CC or the second CC within the time period based at least in part on a first property of the first DCI and a second property of the second DCI.

In another aspect, a method for wireless communication at a network node is provided that includes transmitting a first DCI indicating a first TCI state to be applied for a first CC at a first BAT, transmitting a second DCI indicating a second TCI state to be applied for the first CC or a second CC at a second BAT, and where the first BAT and the second BAT are within a same time period, applying the first TCI state or the second TCI state for one or more of the first CC or the second CC within the time period based at least in part on a first property of the first DCI and a second property of the second DCI.

In another aspect, a method for wireless communication at a UE is provided that includes receiving a first DCI indicating a first TCI state to be applied for a first CC at a first BAT, receiving a second DCI indicating a second TCI state to be applied for the first CC or a second CC at a second BAT, where the first BAT is earlier, in time, than the second BAT, where the first DCI is received earlier than the second DCI, applying the first TCI state at the first BAT and applying the second TCI state at the second BAT, and where the second DCI is received earlier than the first DCI, applying the first TCI state at the first BAT and refraining from applying the second TCI state at the second BAT.

In another aspect, a method for wireless communication at a network node is provided that includes transmitting a first DCI indicating a first TCI state to be applied for a first CC at a first BAT, and refraining from transmitting, after the first DCI, a second DCI indicating a second TCI state to be applied for the first CC or a second CC at a second BAT, where the second BAT is earlier than the first BAT.

In an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to receive a first DCI indicating a first TCI state to be applied for a first CC at a first BAT, receive a second DCI indicating a second TCI state to be applied for the first CC or a second CC at a second BAT, and where the first BAT and the second BAT are within a same time period, apply the first TCI state or the second TCI state for one or more of the first CC or the second CC within the time period based at least in part on a first property of the first DCI and a second property of the second DCI.

In an aspect, an apparatus for wireless communication is provided that includes a transceiver, one or more memories configured to, individually or in combination, store instructions, and one or more processors communicatively coupled with the one or more memories. The one or more processors are, individually or in combination, configured to execute the instructions to cause the apparatus to transmit a first DCI indicating a first TCI state to be applied for a first CC at a first BAT, transmit a second DCI indicating a second TCI state to be applied for the first CC or a second CC at a second BAT, and where the first BAT and the second BAT are within a same time period, apply the first TCI state or the second TCI state for one or more of the first CC or the second CC within the time period based at least in part on a first property of the first DCI and a second property of the second DCI.

In a further aspect, an apparatus for wireless communication is provided that includes a transceiver, one or more memories configured to store instructions, and one or more processors communicatively coupled with the transceiver and the one or more memories. The one or more processors are configured to execute the instructions to perform the operations of methods described herein. In another aspect, an apparatus for wireless communication is provided that includes means for performing the operations of methods described herein. In yet another aspect, one or more computer-readable media is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
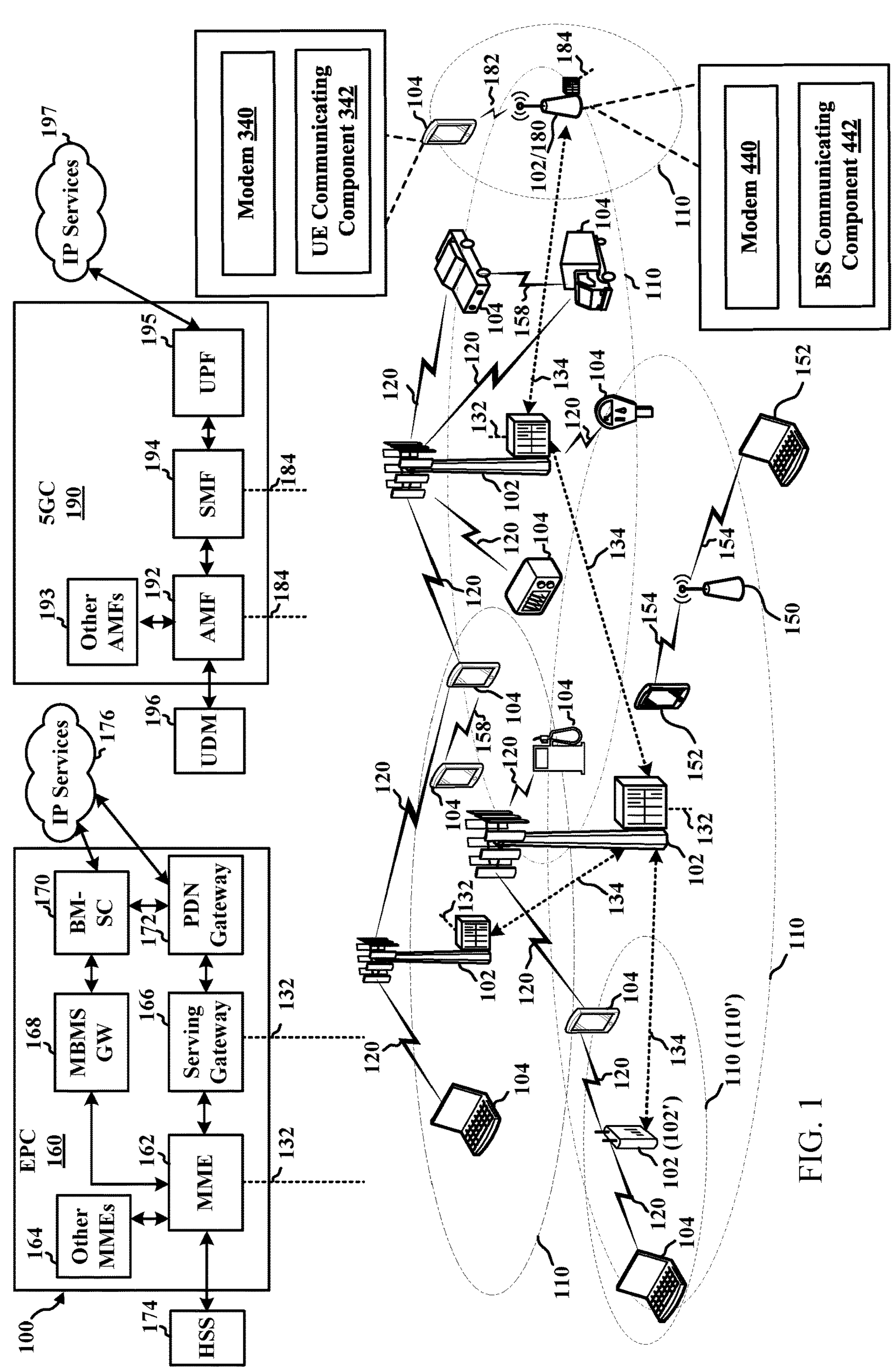
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to updating transmission configuration indicator (TCI) states in wireless communications. In some wireless communication technologies, such as fifth generation (5G) new radio (NR), a network node can configure a user equipment (UE) with TCI states that can be used for communications between the network node and the UE. For example, the TCI states can correspond to quasi-colocation (QCL) parameters or a beam to use for communications over a component carrier (CC) to achieve a spatial direction for the communications. In one example, the network node can configure TCI states using radio resource control (RRC) signaling, and can also activate a subset of the configured TCI states using a media access control (MAC) control element (CE), which may indicate indices of the RRC configured TCI states that are to be activated. The network node can also indicate, in downlink control information (DCI) one of the TCI states (e.g., an index of an activated TCI state) to be used for communications related to the DCI (e.g., communications over a resource grant indicated by the DCI). In addition, in 5G NR, communication resources can be divided, in the time domain, into symbols (e.g., orthogonal frequency division multiplexing (OFDM), single carrier-frequency division multiplexing (SC-FDM), etc. symbols), slots of multiple symbols, etc.

In an example, in 5G NR, a DCI of format 1_1 or 1_2 can be used to indicate TCI state, to be used by a UE in communicating with a network node, without scheduling any DL assignment, when the cyclic redundancy check (CRC) of the DCI is scrambled by configured scheduling-radio network temporary identifier (CS-RNTI). In this example, the redundancy version (RV) and modulation and coding scheme (MCS) fields of the DCI format 1_1 or 1_2, as defined in 5G NR, can be set as all '1's, the new data indicator (NDI) can be 0, the frequency domain resource allocation (FDRA) can be all '0's for FDRA Type 0, or all '1's for FDRA Type 1, or all '0's for dynamicSwitch, the TCI field can be set to indicate the TCI state ID, the PDSCH-to-HARQ_feedback timing indicator field (if present) can be used to indicate the time offset from the DCI to its acknowledgment (ACK) in physical uplink control channel (PUCCH), and for type-1 hybrid automatic repeat/request (HARQ)-ACK codebook, the time domain resource allocation (TDRA) field can be used to derive a virtual physical downlink shared channel (PDSCH) location, which can further be used to determine a location for the ACK information in the HARQ-ACK codebook.

For example, for DCI-based beam or TCI state indication, a UE and/or network node can apply the new TCI state in the first slot that is at least a number, X, of milliseconds (ms) or a number, Y, of symbols after the last symbol of the ACK of the DCI that includes the joint or separate DL/UL beam indication. For example, ACK to beam indication DCI can include a dedicated ACK (e.g., when the DCI has no downlink (DL) resource grant or assignment), or can otherwise include ACK to scheduled PDSCH resource grant. For example, X ms or Y symbols can satisfy a UE capability for switching beams after transmitting the ACK. In an example, when a common TCI state is applied among multiple CCs, the X or Y can be determined based on the CC with smallest subcarrier spacing (SCS). In one example, for MAC-CE based beam or TCI state activation, the indicated TCI(s) can be activated 3 ms after the ACK to the MAC-CE.

In 5G NR, for example, technical specification (TS) 38.214 indicates when the UE would transmit the last symbol of a PUCCH with HARQ-ACK information corresponding to the DCI carrying the TCI-State indication and without DL assignment, or corresponding to the PDSCH scheduling by the DCI carrying the TCI-State indication, and if the indicated TCI-State is different from the previously indicated one, the indicated [TCI-State] with [tci-StateId_r17], which may be configured in RRC signaling, should be applied starting from the first slot that is at least BeamAppTime_r17 symbols after the last symbol of the PUCCH. The first slot and the BeamAppTime_r17 symbols are both determined on the active bandwidth part (BWP) with the smallest SCS among the carrier(s) applying the beam indication. The UE can assume one indicated [TCI-State] with [tci-StateId_r17] for downlink (DL) and uplink (UL), for DL only, or for UL only at a time.

In some examples, a UE can be configured with multiple CC lists, where each list can include multiple CCs that are or can be configured for communications between the UE and a network node. In an example, CCs on the same list share the same TCI update or indication from DCI, MAC-CE, etc. A CC can be at most included in one of the CC lists. In an example, where CC1 and CC2 are configured on the same list, if the UE receives a TCI update MAC-CE for CC1, then the UE can apply the update to both CC1 and CC2. In another example where CC1 and CC2 are configured on the same list, if the UE receives a DCI indicating a TCI update for CC1, then the UE can apply the same TCI to both CC1 and CC2. In an example, the timeline for DCI update across multiple CCs can include a first slot after X symbols counting from the last symbol of ACK to the DCI, where the duration X can be configured per BWP in RRC. When CCs to apply the beam indication have different SCS (e.g., different symbol durations), the UE and/or network node can use the active BWP with the smallest SCS (e.g., largest symbol length) to determine the timeline.

In an example, in 5G NR, the UE and/or network node can determine a beam application time (BAT) at which to apply a beam after configuration of the beam, which can be based on when a communication indicating to apply the beam is received or is acknowledged. In an example, the first slot and the symbols of the BAT, which also can refer to the BeamAppTime_r17 parameter in 5G NR, can be determined on the active BWP with the smallest SCS among the active BWP(s) of the carrier(s) applying the beam indication. The active BWP (e.g., for a given CC), however, may change over time. For example, the network node can change the active BWP for a given CC for multiple reasons, such as to modify a size of the BWP for power savings or to schedule larger amounts of data, to mitigate interference to other UEs, and/or the like. Thus, the CC with the smallest SCS may change between the time of receiving the TCI update or indication and the time at which the TCI update or indication is applied. In this regard, aspects described herein can relate to whether the active BWP is determined based on DCI reception time (for the TCI state update or indication) or ACK time for the DCI. In other aspects described herein, the network node may avoid the active BWP being changed in between DCI and its corresponding ACK, which may result in different BAT duration determinations.

In addition, in an example, a network node can employ PDCCH repetition in transmitting PDCCH to a UE. For example, if a PDCCH reception by a UE includes two PDCCH candidates from corresponding search space sets, a PDCCH monitoring occasion, for monitoring PDCCH by the UE, can be the union of the PDCCH monitoring occasions for the two PDCCH candidates. In addition, in this example, the end of the PDCCH reception can be the end of the PDCCH candidate that ends later. The PDCCH reception can includes the two PDCCH candidates also when the UE is not required to monitor one of the two PDCCH candidates. In this example, aspects described herein can relate to indicating or deciding which of multiple PDCCH candidates (or which of multiple DCIs received in the multiple PDCCH candidates) is used when applying a TCI update or indication.

In some aspect described herein, the UE may not expect, in any CC, for the TCI indicated by a second DCI to take effect earlier than (or no later than) that indicated in a first DCI that is received earlier than the second DCI. In one example, a network node can ensure this rule. In another example, a UE can ignore a TCI indication that is indicated by a first DCI received earlier than (or no later than) the second DCI corresponding to the current indicated TCI. In other aspects described herein, the UE and/or network node can handle cases where multiple DCIs indicating a TCI state update or indication are to be applied in a similar time period (e.g., in a same slot). For example, a priority rule can be defined based on which TCI indication corresponds to a later monitoring occasion, based on a CC ID of a CC over which the DCI is received or transmitted, and/or other considerations.

In any case, for example, defining or otherwise allowing the UE and/or network node to apply a TCI state based on multiple received TCI state indications or updates can allow for predictable behavior by the UE and network node, which can improve accuracy of the TCI state indication or update procedure. This can improve communication efficiency between the UE and network node, which can can improve resource usage, UE performance, and thus user experience with using the UE, etc.

The described features will be presented in more detail below with reference to FIGS. 1-13.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for applying a TCI state based on multiple received DCIs, in accordance with aspects described herein. In addition, some nodes may have a modem 440 and BS communicating component 442 for configuring a UE to apply a TCI state based on multiple received DCIs, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, BS communicating component 442 can transmit, and/or UE communicating component 342 can receive, TCI state update or indication information in multiple DCIs over one or more CCs. For example, UE communicating component 342 and/or BS communicating component 442 can apply a TCI state update or indication from a given one of the multiple DCIs where the DCIs are received in a same time period (e.g., a same slot). In another example, BS communicating component 442 can refrain from sending TCI state updates or indications between a time when an initial TCI state update or indication is sent and the time when the initial TCI state update or indication is applied by the UE. In yet another example, UE communicating component 342 can ignore, or refrain from applying, TCI state updates or indications received before an initial TCI state update or indication and to be applied after the initial TCI state update or indication. In these examples, and/or other examples described herein, the UE 104 and base station 102 can apply the same TCI states where multiple DCIs indicating TCI states for one or more associated CCs are received.

Figure 2:
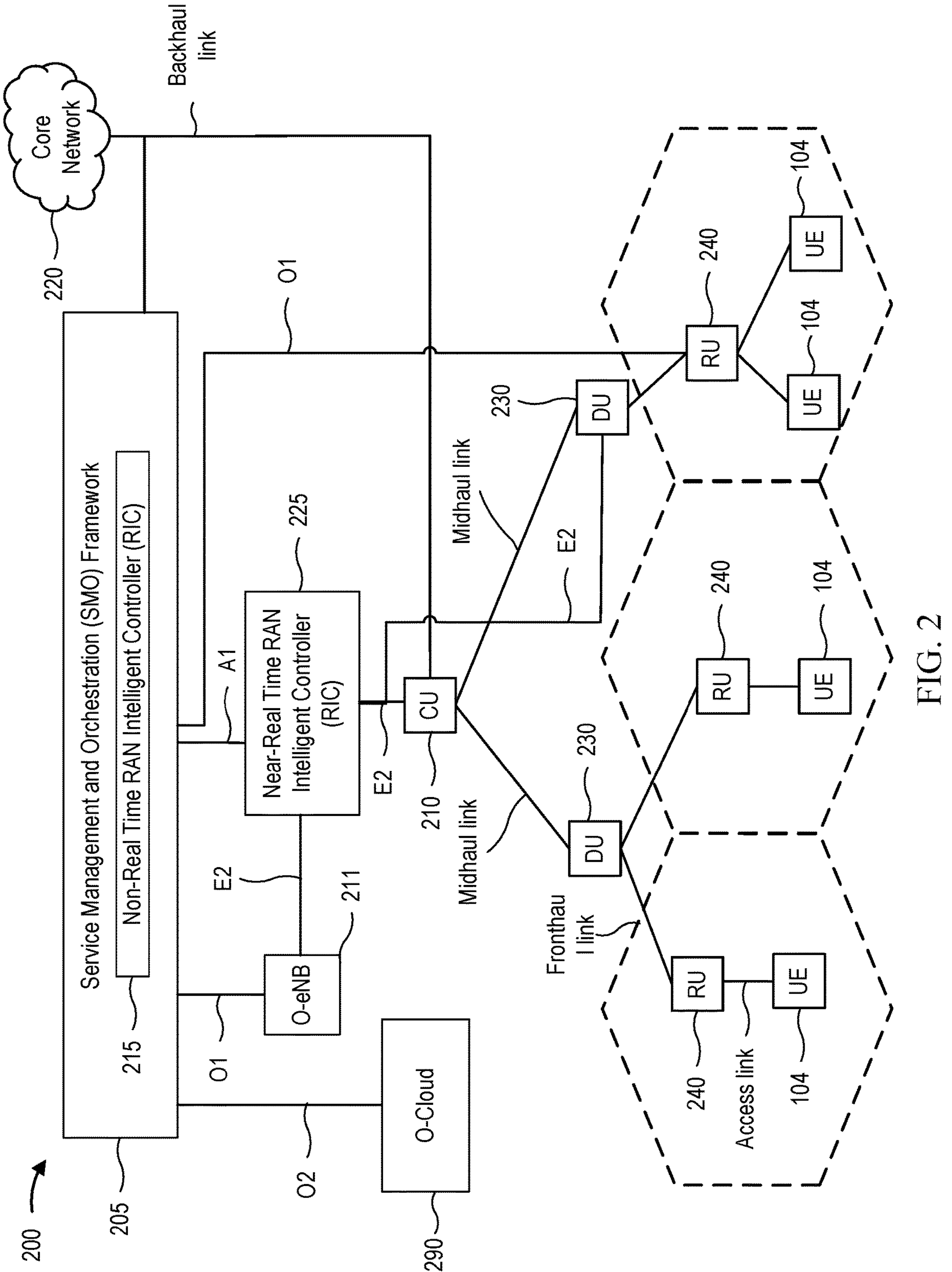
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can transmit TCI state updates or indications to UEs, apply TCI state updates or indications for the UEs, etc. via one or more DUs 230, transmit configuration information to the UEs via one or more DUs 230, and/or the like. In another example, BS communicating component 442, as described herein, can be at least partially implemented within a DU 230, and transmit TCI state updates or indications to UEs, apply TCI state updates or indications for the UEs, etc. via one or more RUs 240, and/or the like.

Turning now to FIGS. 3-13, aspects are depicted with reference to one or more components and one or more methods that may perform the actions or operations described herein, where aspects in dashed line may be optional. Although the operations described below in FIGS. 5, 6, 11, and 12 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
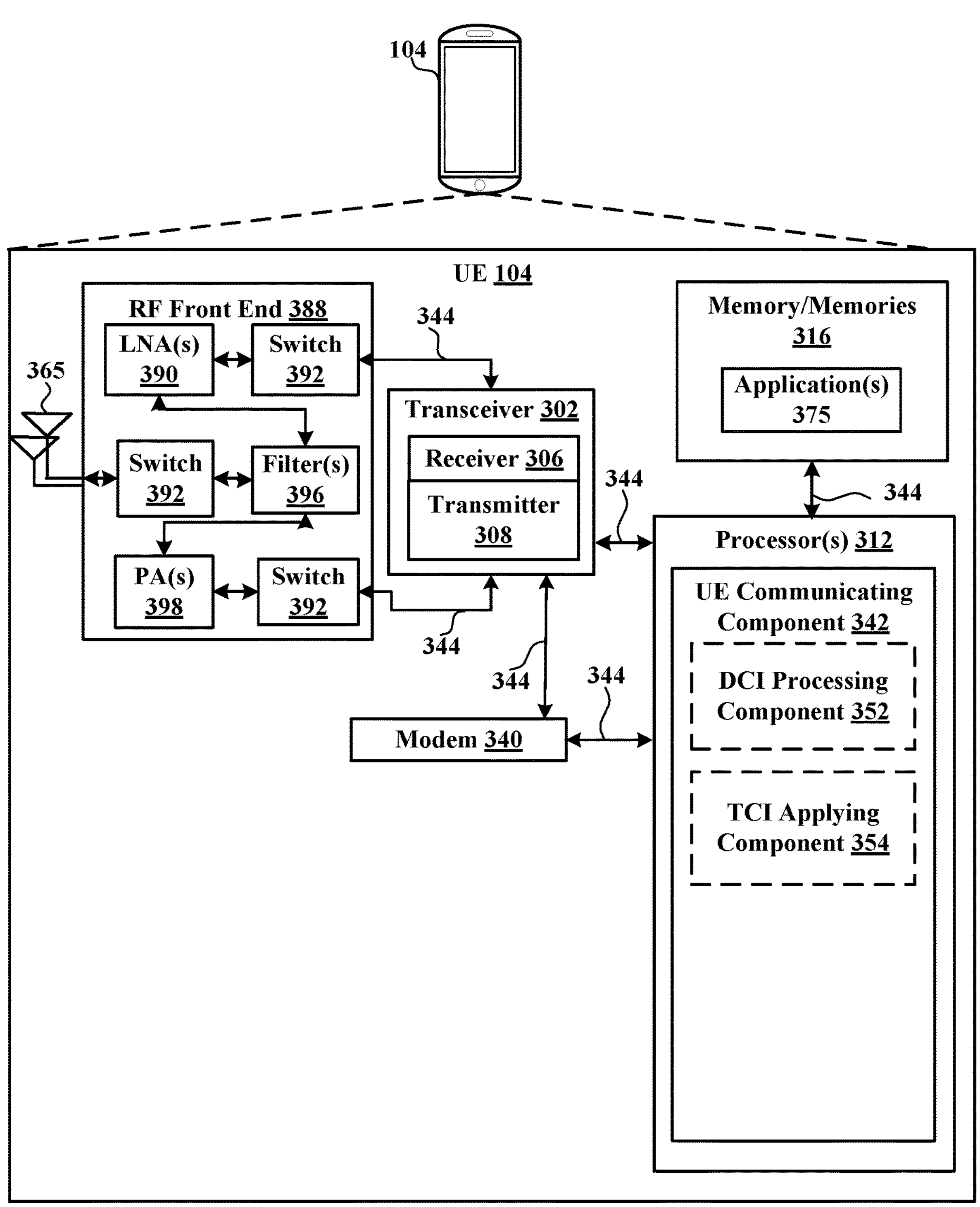
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and one or more memories 316 and one or more transceivers 302 in communication via one or more buses 344. For example, the one or more processors 312 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 316 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 312, one or more memories 316, and one or more transceivers 302 may operate in conjunction with modem 340 and/or UE communicating component 342 for applying a TCI state based on multiple received DCIs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory/memories 316 may be configured to store data used herein and/or local versions of applications 375 or UE communicating component 342 and/or one or more of its subcomponents being executed by at least one processor 312. Memory/memories 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory/memories 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a DCI processing component 352 for processing DCIs received from a network node, which may include a TCI state indication or update for one or more CCs, and/or TCI applying component 354 for applying a TCI state for the one or more CCs based on one of multiple received DCIs, in accordance with aspects described herein.

In an aspect, the processor(s) 312 may correspond to one or more of the processors described in connection with the UE in FIG. 13. Similarly, the memory/memories 316 may correspond to the memory/memories described in connection with the UE in FIG. 13.

Figure 4:
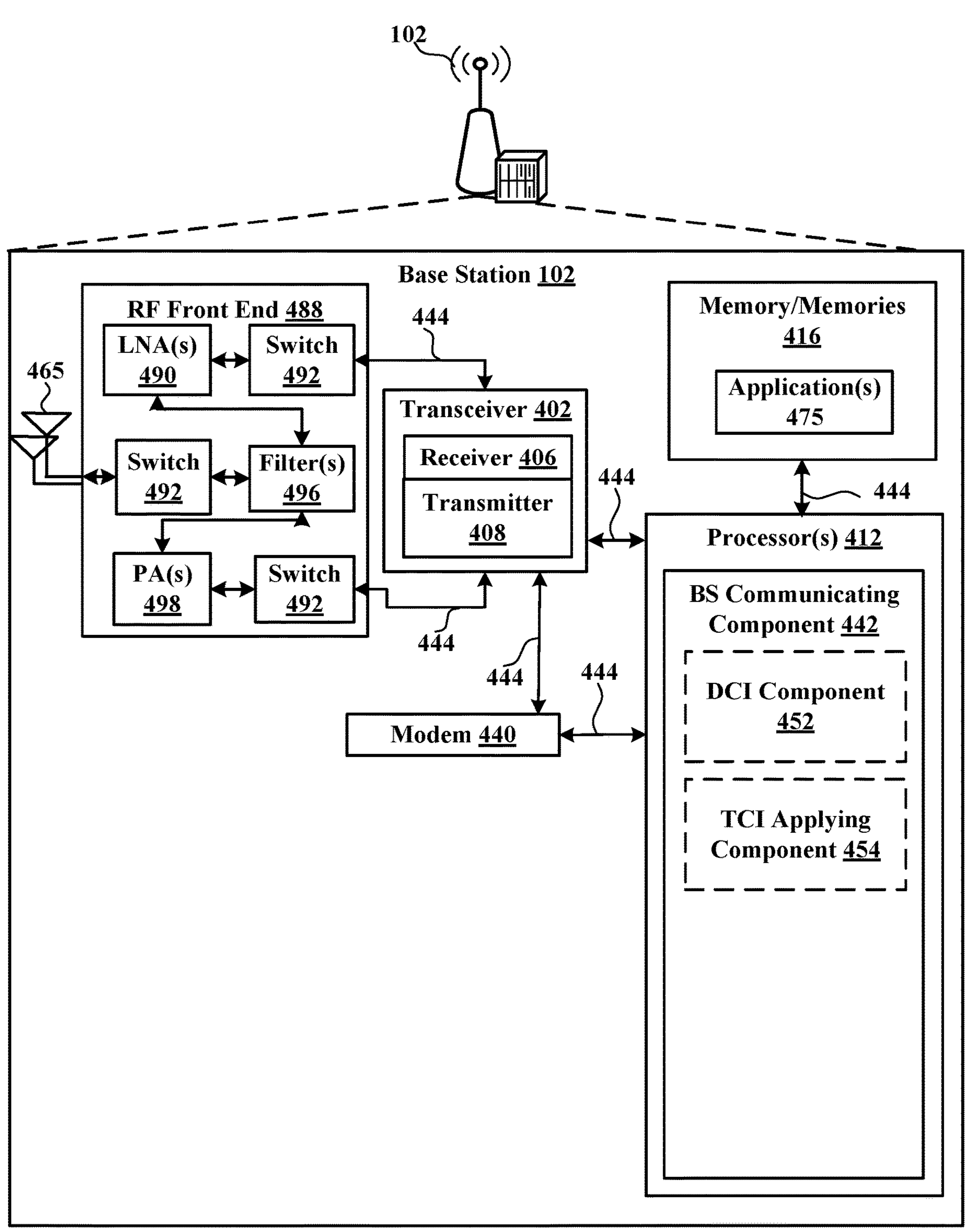
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and one or more memories 416 and one or more transceivers 402 in communication via one or more buses 444. For example, the one or more processors 412 can include a single processor or multiple processors configured to perform one or more functions described herein. For example, the multiple processors can be configured to perform a certain subset of a set of functions described herein, such that the multiple processors together can perform the set of functions. Similarly, for example, the one or more memories 416 can include a single memory device or multiple memory devices configured to store instructions or parameters for performing one or more functions described herein. For example, the multiple memory devices can be configured to store the instructions or parameters for performing a certain subset of a set of functions described herein, such that the multiple memory devices together can store the instructions or parameters for the set of functions. The one or more processors 412, one or more memories 416, and one or more transceivers 402 may operate in conjunction with modem 440 and BS communicating component 442 for configuring a UE to apply a TCI state based on multiple received DCIs, in accordance with aspects described herein.

The transceiver 402, receiver 406, transmitter 408, one or more processors 412, memory/memories 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a DCI component 452 for transmitting DCIs to a UE to indicate TCI state for one or more CCs, schedule resources (e.g., PDSCH, PUCCH, PUSCH resources, etc.), and/or TCI applying component 454 for applying a TCI state for the one or more CCs based on one of multiple transmitted DCIs, in accordance with aspects described herein.

In an aspect, the processor(s) 412 may correspond to one or more of the processors described in connection with the base station in FIG. 13. Similarly, the memory/memories 416 may correspond to the memory/memories described in connection with the base station in FIG. 13.

Figure 5:
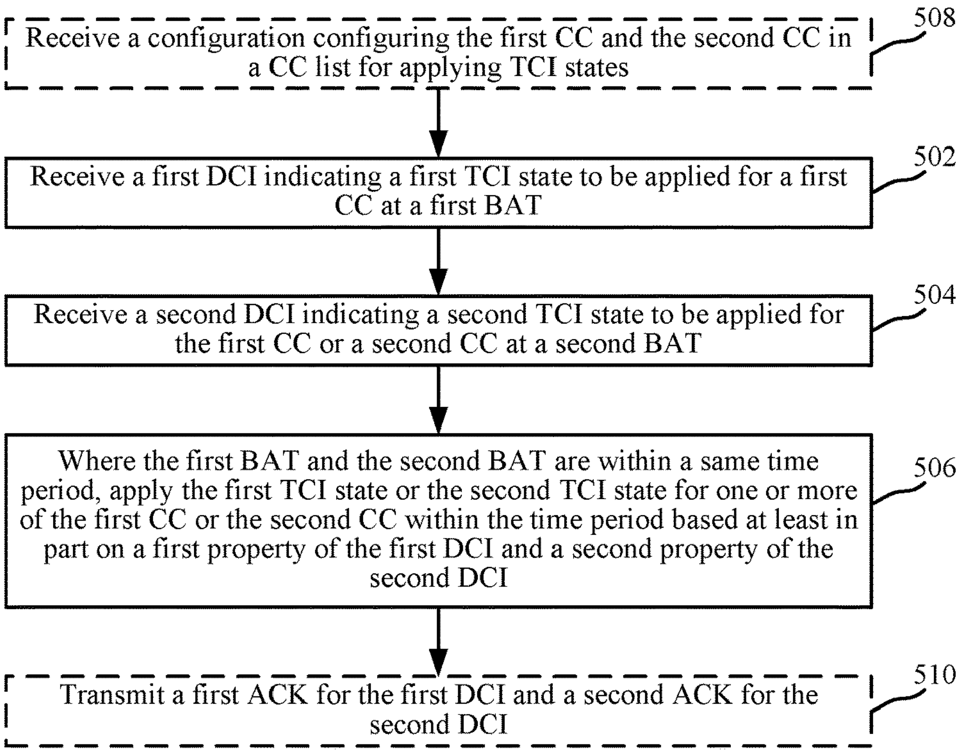
FIG. 5 is a flow chart illustrating an example of a method for applying a transmission configuration indicator (TCI) state based on multiple received downlink control information (DCIs), in accordance with aspects described herein.
Figure 6:
FIG. 6 is a flow chart illustrating an example of a method for configuring a UE to apply a TCI state based on multiple received DCIs, in accordance with aspects described herein.
Figure 6:
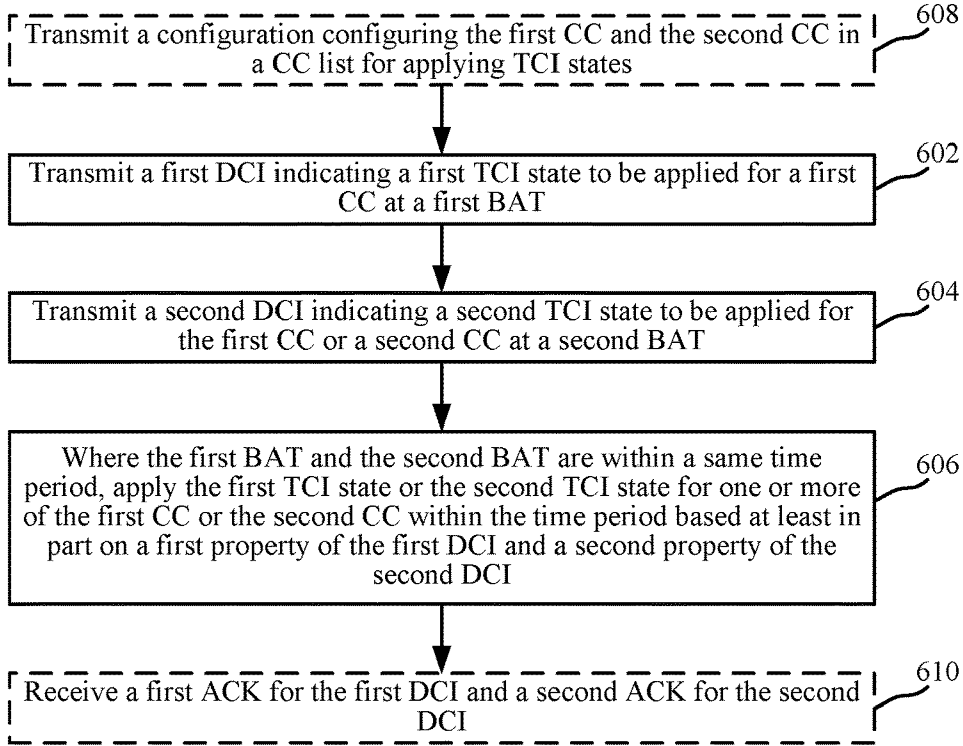

FIG. 5 illustrates a flow chart of an example of a method 500 for applying a TCI state based on multiple received DCIs, in accordance with aspects described herein. FIG. 6 illustrates a flow chart of an example of a method 600 for configuring a UE to apply a TCI state based on multiple received DCIs, in accordance with aspects described herein. In an example, a UE 104 can perform the functions described in method 500 using one or more of the components described in FIGS. 1 and 3. In an example, a base station 102 (e.g., a gNB, a monolithic base station, a portion of a disaggregated base station, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, at Block 602, a first DCI indicating a first TCI state to be applied for a first CC at a first BAT can be transmitted. In an aspect, DCI component 452, e.g., in conjunction with processor(s) 412, memory/memories 416, transceiver 402, BS communicating component 442, etc., can transmit (e.g., for a UE 104) the first DCI indicating the first TCI state to be applied for the first CC in the first BAT. For example, the network node can have configured multiple TCI states in RRC signaling and/or activated multiple TCI states (e.g., a subset of the TCI states configured in RRC signaling) via MAC-CE. In an example, BS communicating component 442 can transmit the DCI to indicate one of the configured or activated TCI states to be applied for a CC, for communications over resources indicated in the DCI, etc. For example, DCI component 452 can transmit the DCI over a PDCCH in a PDCCH monitoring occasion, and/or can transmit the DCI in multiple PDCCH repetitions in multiple PDCCH monitoring occasions, as described above.

In method 600, at Block 604, a second DCI indicating a second TCI state to be applied for the first CC or a second CC at a second BAT can be transmitted. In an aspect, DCI component 452, e.g., in conjunction with processor(s) 412, memory/memories 416, transceiver 402, BS communicating component 442, etc., can transmit (e.g., for the UE 104) the second DCI indicating the second TCI state to be applied for the first CC or the second CC in the second BAT. For example, DCI component 452 can transmit the second DCI over the first CC or the second CC or as otherwise indicating the first CC or the second CC. In addition, for example, DCI component 452 can transmit the second DCI after transmitting the first DCI and before the first TCI state from the first DCI is applied.

In method 500, at Block 502, the first DCI indicating a first TCI state to be applied for a first CC at a first BAT can be received. In an aspect, DCI processing component 352, e.g., in conjunction with processor(s) 312, memory/memories 316, transceiver 302, UE communicating component 342, etc., can receive the first DCI indicating the first TCI state to be applied for the first CC in the first BAT. For example, the first DCI can identify the first TCI state as one of multiple configured or activated TCI states (e.g., using an index into a list of activated TCI state identifiers). For example, DCI processing component 352 can receive the DCI over a PDCCH in a PDCCH monitoring occasion (which may also include a resource grant), and/or can receive the DCI in multiple PDCCH repetitions in multiple PDCCH monitoring occasions, as described above. In any case, for example, DCI processing component 352 can apply the TCI state update or indication at or after the first BAT. In addition, as described, the BAT can also be configured for the UE 104.

In method 500, at Block 504, a second DCI indicating a second TCI state to be applied for the first CC or a second CC at a second BAT can be received. In an aspect, DCI processing component 352, e.g., in conjunction with processor(s) 312, memory/memories 316, transceiver 302, UE communicating component 342, etc., can receive the second DCI indicating the second TCI state to be applied for the first CC or the second CC in the second BAT. For example, DCI processing component 352 can receive the second DCI over the first CC or the second CC or as otherwise indicating the first CC or the second CC. In addition, for example, DCI processing component 352 can receive the second DCI after transmitting the first DCI and before the first TCI state from the first DCI is applied.

In some examples, the second TCI state may have a BAT in a same time period as the first TCI state, or in other words, the later received beam indication can take effect at an earlier time that an earlier received beam indication. For example, assuming the active BWP is accounted at the time of receiving beam indication DCI (e.g., the first DCI with the first TCI state indication), or when the active BWP is accounted at the time of sending ACK for the first DCI, after BWP change, the second TCI state in the second DCI indication may take effect before or at the same time (e.g., in a same slot) as the first TCI state. In one example, a later DCI may reflect the latest decision of the network and may accordingly override any earlier and conflicting DCIs. Where the TCI states are to be applied in the same time period (e.g., a same slot), the network node and/or UE 104 can apply either the first or second TCI state based on one or more rules.

Accordingly, for example, in method 500, at Block 506, where the first BAT and the second BAT are within a same time period (e.g., within a same slot), the first TCI state or the second TCI state can be applied for one or more of the first CC or the second CC within the time period based at least in part on a first property of the first DCI and a second property of the second DCI. In an aspect, TCI applying component 354, e.g., in conjunction with processor(s) 312, memory/memories 316, transceiver 302, UE communicating component 342, etc., can, where the first BAT and the second BAT are within a same time period (e.g., within a same slot), apply the first TCI state or the second TCI state for one or more of the first CC or the second CC within the time period based at least in part on the first property of the first DCI and the second property of the second DCI. For example, the first property and the second property can be one or more of monitoring occasions for the first DCI and the second DCI, CCs corresponding to the DCIs, BWP identifiers (IDs) corresponding to the DCIs, ACK times corresponding to the DCIs, control resource set (CORESET) IDs corresponding to the DCIs, search space (SS) set IDs corresponding to the DCIs, etc.

Similarly, for example, in method 600, at Block 606, where the first BAT and the second BAT are within a same time period (e.g., within a same slot), the first TCI state or the second TCI state can be applied for one or more of the first CC or the second CC within the time period based at least in part on a first property of the first DCI and a second property of the second DCI. In an aspect, TCI applying component 454, e.g., in conjunction with processor(s) 412, memory/memories 416, transceiver 402, BS communicating component 442, etc., can, where the first BAT and the second BAT are within a same time period (e.g., within a same slot), apply the first TCI state or the second TCI state for one or more of the first CC or the second CC within the time period based at least in part on the first property of the first DCI and the second property of the second DCI. In this regard, the network node and UE 104 can apply and can communicate using the same (or reciprocal) beam at a given point in time. An example is shown in FIG. 7.

Figure 7:
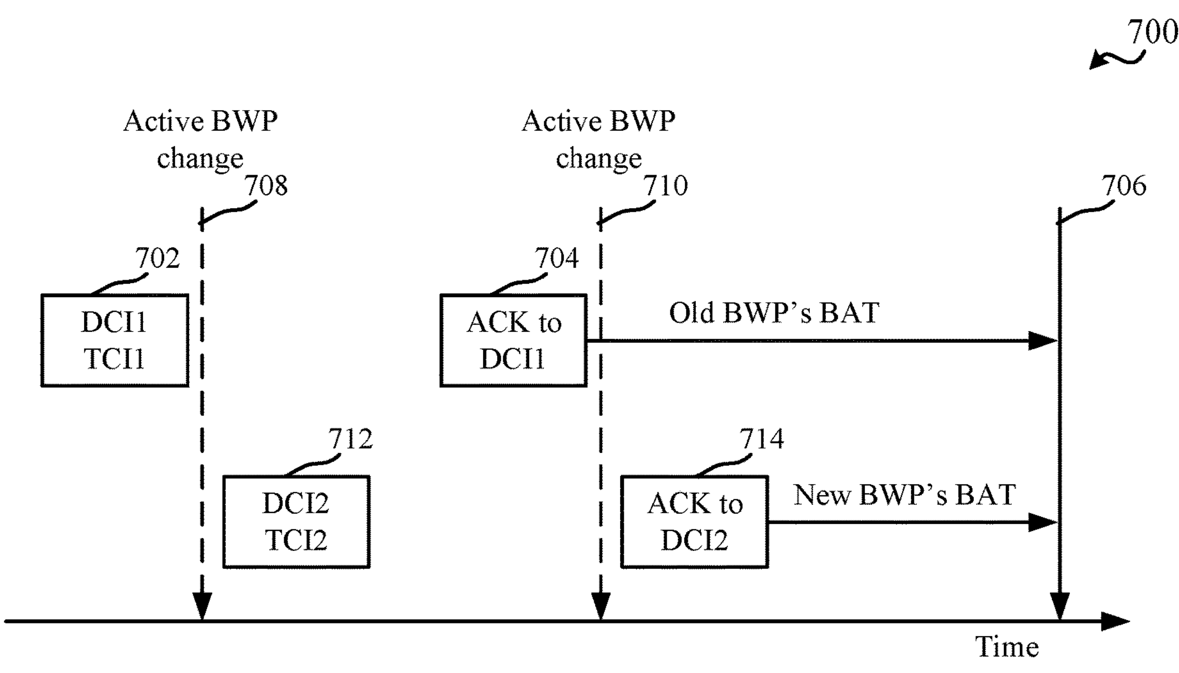
FIG. 7 illustrates an example of a timeline where multiple DCIs with TCI indications or updates are communicated, in accordance with aspects described herein.

FIG. 7 illustrates an example of a timeline 700 where multiple DCIs with TCI indications or updates are communicated. In timeline 700, DCI1 702 can be communicated that includes TCI1 state update or indication. A UE receiving DCI1 702 can be scheduled to transmit feedback (e.g., based on a k value, as defined in 5G NR, or other offset from receiving the DCI1 702) and can transmit ACK to DCI1 at 704. The UE can apply TCI1 state after a BAT at time 706, which may correspond to a slot. In addition, in timeline 700, an active BWP change can be received at 708 or 710. For example, the network node can change a BWP for one or more CCs at 708 or 710 using RRC signaling, MAC-CE, DCI, etc. Moreover, in timeline 700, DCI2 712 can be communicated that includes TCI2 state update or indication. The UE receiving DCI2 712 can be scheduled to transmit feedback (e.g., based on a k value or other offset from receiving the DCI2 712) and can transmit ACK to DCI2 at 714. The UE can apply TCI2 state after a BAT at time 706 as well, which may be due to the BWP change at 708 or 710. In this example, and as described above and further herein, TCI applying component 354 of the UE 104 and/or TCI applying component 454 of the network node can apply either TCI1 state or TCI2 state, for one or more CCs, based on one or more rules, associated parameters, and/or the like.

In method 600, optionally at Block 608, a configuration configuring the first CC and the second CC in a CC list for applying the TCI states can be transmitted. In an aspect, BS communicating component 442, e.g., in conjunction with processor(s) 412, memory/memories 416, transceiver 402, etc., can transmit (e.g., for the UE 104) the configuration configuring the first CC and the second CC in the CC list for applying TCI states. For example, BS communicating component 442 can transmit the configuration using RRC signaling, MAC-CE, DCI, etc. and configure multiple CCs in a CC list, where the CC list can relate to applying the same TCI state for the CCs. In this regard, when the network node configures a TCI state for one CC (e.g., in a DCI received over, or otherwise indicating, the one CC), this can indicate to apply the TCI state to the one CC and any other CCs in a same CC list as the one CC.

In method 500, optionally at Block 508, a configuration configuring the first CC and the second CC in a CC list for applying the TCI states can be received. In an aspect, UE communicating component 342, e.g., in conjunction with processor(s) 312, memory/memories 316, transceiver 302, etc., can receive the configuration configuring the first CC and the second CC in the CC list for applying TCI states. For example, UE communicating component 342 can receive the configuration using RRC signaling, MAC-CE, DCI, etc. and configure multiple CCs in a CC list, where the CC list can relate to applying the same TCI state for the CCs in the list. In this regard, when the network node configures a TCI state for one CC (e.g., in a DCI received over, or otherwise indicating, the one CC), TCI applying component 354 can apply the TCI state to the one CC and any other CCs in a same CC list as the one CC.

In this example, the first DCI and second DCI may relate to different CCs, and TCI applying component(s) 354 and/or 454 can apply the TCI state for each of the different CCs based on the CCs being configured in the CC list and based on the one or more rules for selecting which TCI state to be applied with the TCI states have a BAT in the same or similar time period (e.g., within a slot). For example, a rule can be defined to prioritize the DCIs. Among all CCs which share the same TCI indication, if at least in a CC, two different TCI indications are to take effect at the same time, then the TCI indications can be prioritized by the rule, and the prioritized TCI can be applied. The priority rule can be defined based on the first property and the second property (e.g., based on comparing the first property to the second property or otherwise selecting one of the first TCI or the second TCI based on the first property and the second property).

For example, the TCI applying component(s) 354 and/or 454 can apply the first TCI state or the second TCI state based on a priority rule for the TCI states (and/or corresponding DCIs) that considers one or more of the following aspects, and/or may also define a tiebreaking order for when the TCI states are to be applied at a same time period: the TCI indication corresponding to a later monitoring occasion of the corresponding DCI can be prioritized; the TCI indication indicated in the DCI for the CC having a lowest (or highest or certain) CC ID can be prioritized; the TCI indication indicated in the DCI for the BWP having a lowest (or highest or certain) BWP ID can be prioritized; the TCI indication indicated as having an earliest (or latest or certain) ACK time can be prioritized; the TCI indication having a lowest (or highest or certain) CORESET ID can be prioritized; the TCI indication having a lowest (or highest or certain) SS set ID can be prioritized; etc. In one specific example, TCI applying component(s) 354 and/or 454 can apply the first TCI state or the second TCI state based on which TCI indication corresponds to a later monitoring occasion of the corresponding DCI, and if the first TCI state and the second TCI state correspond to the same monitoring occasion for the DCI (or at least monitoring occasions that are in the same time period, such as a same symbol or slot), then TCI applying component(s) 354 and/or 454 can apply the first TCI state or the second TCI state based on the CC ID of the CC over which the corresponding TCI state is received in the corresponding DCI (e.g., TCI applying component(s) 354 and/or 454 can apply the TCI state corresponding to the lowest CC ID). An example is shown in FIG. 8.

Figure 8:
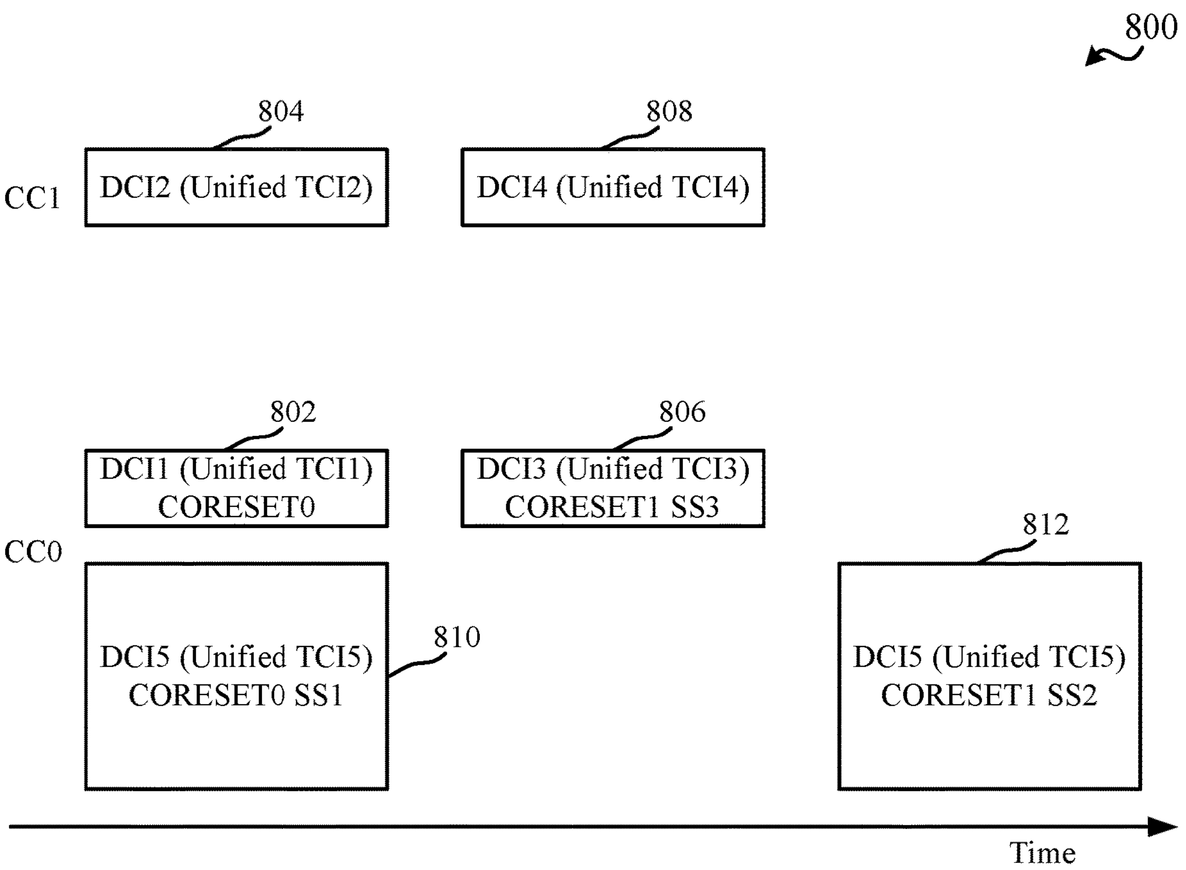
FIG. 8 illustrates an example of a timeline for receiving multiple DCIs with TCI state updates or indications over multiple component carriers (CCs), in accordance with aspects described herein.

FIG. 8 illustrates an example of a timeline 800 for receiving multiple DCIs with TCI state updates or indications over multiple CCs. In timeline 800, DCIs are received over CC0 and CC1, which can be associated with one another in a CC list. For example, in timeline 800, DCI1 802 can be received over CC0 and can include TCI1 as a unified TCI (e.g., unified DL and UL) based on CORESET0. In addition, in timeline 800, DCI2 804 can be received over CC1 and can include TCI2 as a unified TCI. In addition, in timeline 800, DCI3 806 can be received over CC0 and can include TCI3 as a unified TCI based on CORESET1 and SS3. In addition, in timeline 800, DCI4 808 can be received over CC1 and can include TCI4 as a unified TCI. In addition, in timeline 800, DCI5 810 can be received over CC0 and can include TCI5 as a unified TCI based on CORESET0 and SS1, and also a repetition of DCI5 812 can be received over CC0 and can include TCI5 as the unified TCI based on CORESET1 and SS2.

In addition to the above rules, for example, where a TCI state is associated with a PDCCH repetition, such as TCI 5, TCI applying component(s) 354 and/or 454 can apply the TCI state based on the monitoring occasion of one of the repetitions, such as the earliest repetition or the latest repetition. In an example, the monitoring occasion can be the union of all repetitions. In one example, the monitoring occasion for the rule for applying the TCI state can be determined based on an earliest symbol of the occasion, the last symbol in the earliest repetition, the last symbol of the occasion, etc. In the example of timeline 800, and where the monitoring occasion can be determined based on the earliest symbol of the occasion, TCI applying component(s) 354 and/or 454 can apply TCI3, as TCI3 and TCI4 correspond to the latest monitoring occasions (e.g., DCI3 and DCI4, because TCI5 is considered based on the earliest symbol of DCI5 810), and TCI3 corresponds to the CC having a lower (e.g., more prioritized) CC ID of CC0.

For example, based on the indication in 5G NR TS 38.214, when the UE would transmit the last symbol of a PUCCH with HARQ-ACK information corresponding to the lowest CC ID in the latest occasion in which one or more DCIs carrying the TCI-State indication and without DL assignment, or corresponding to the PDSCH scheduling by the DCI carrying the TCI-State indication, and if the indicated TCI-State is different from the previously indicated one, the indicated [TCI-State] with [tci-StateId_r17] should be applied starting from the first slot that is at least BeamAppTime_r17 symbols after the last symbol of the PUCCH. The first slot and the BeamAppTime_r17 symbols are both determined on the active BWP with the smallest SCS among the carrier(s) applying the beam indication. The UE can assume one indicated [TCI-State] with [tci-StateId_r17] for DL and UL), for DL only, or for UL only at a time.

In an example, in method 500, optionally at Block 510, a first ACK for the first DCI and a second ACK for the second DCI can be transmitted. In an aspect, UE communicating component 342, e.g., in conjunction with processor(s) 312, memory/memories 316, transceiver 302, etc., can transmit the first ACK for the first DCI and the second ACK for the second DCI. As described, for example, TCI applying component 354 can apply the TCI state based on a BAT from the time of transmitting the first ACK and/or the second ACK. In one example, where UE communicating component 342 transmits the first ACK and the second ACK within a same time period (e.g., within a same slot), the BAT for the first and second TCI states may occur within a subsequent same time period. In an example, in method 600, optionally at Block 610, a first ACK for the first DCI and a second ACK for the second DCI can be received. In an aspect, BS communicating component 442, e.g., in conjunction with processor(s) 412, memory/memories 416, transceiver 402, etc., can receive the first ACK for the first DCI and the second ACK for the second DCI (e.g., within a same time period). An example is shown in FIG. 9.

Figure 9:
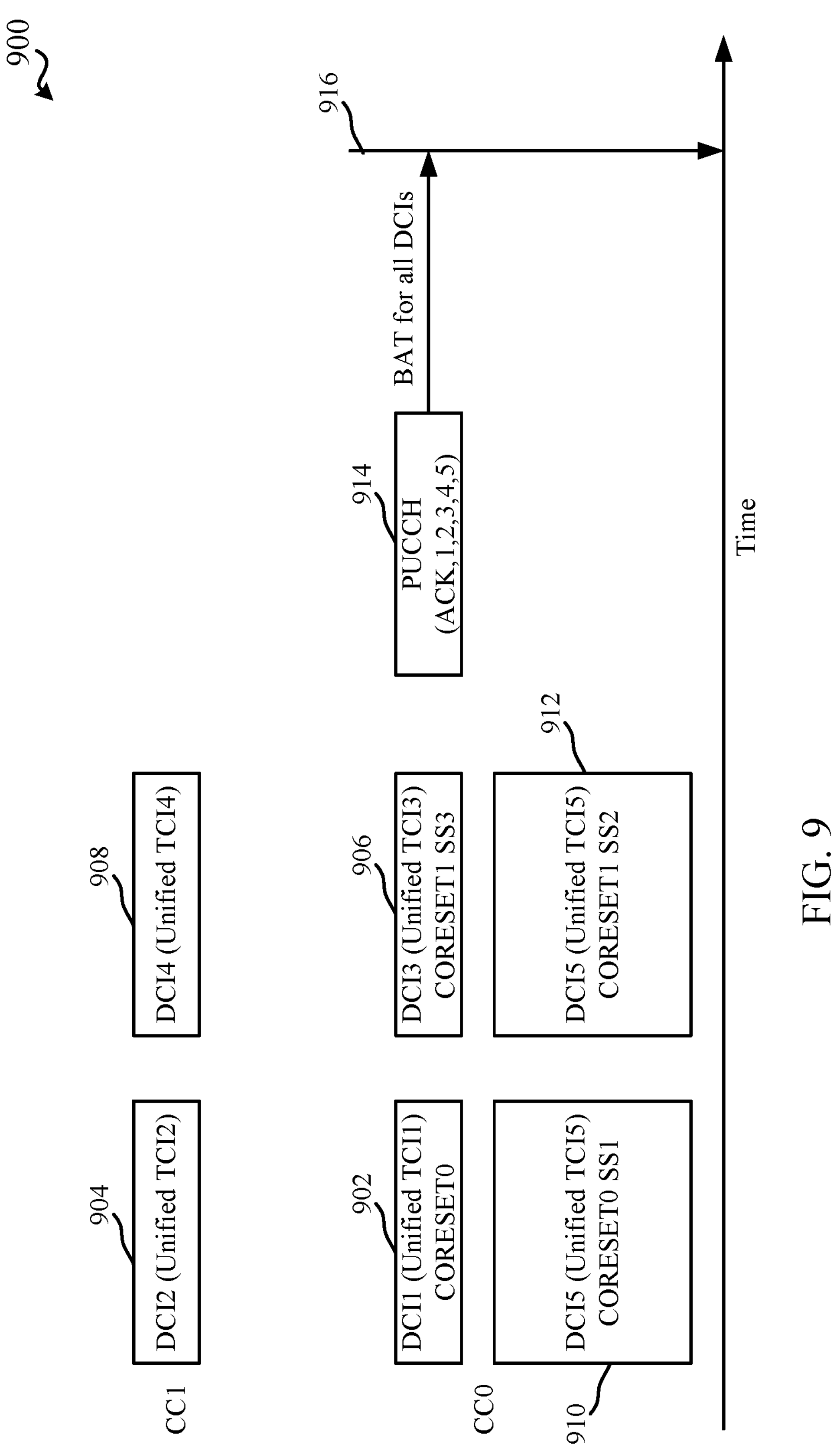
FIG. 9 illustrates an example of a timeline for receiving multiple DCIs with TCI state updates or indications over multiple CCs, and transmitting acknowledgement (ACK) feedback for the multiple DCIs, in accordance with aspects described herein.

FIG. 9 illustrates an example of a timeline 900 for receiving multiple DCIs with TCI state updates or indications over multiple CCs, and transmitting ACK feedback for the multiple DCIs. In timeline 900, DCIs are received over CC0 and CC1, which can be associated with one another in a CC list. For example, in timeline 900, DCI1 902 can be received over CC0 and can include TCI1 as a unified TCI (e.g., unified DL and UL) based on CORESET0. In addition, in timeline 900, DCI2 904 can be received over CC1 and can include TCI2 as a unified TCI. In addition, in timeline 900, DCI5 906 can be received over CC0 and can include TCI3 as a unified TCI based on CORESET1 and SS3. In addition, in timeline 900, DCI4 908 can be received over CC1 and can include TCI4 as a unified TCI. In addition, in timeline 900, DCI5 910 can be received over CC0 and can include TCI5 as a unified TCI based on CORESET0 and SS1, and also a repetition of DCI5 912 can be received over CC0 and can include TCI5 as the unified TCI based on CORESET1 and SS2. In this example, PUCCH 914 can be scheduled for all of the DCIs, and can include ACK for DCIs 1, 2, 3, 4, 5. In this example, the BAT for applying all of DCIs 1, 2, 3, 4, 5 may be at 916. Accordingly, TCI applying component(s) 354 and/or 454 can apply one of the TCI states 1, 2, 3, 4, 5 based on the priority rule(s) described above.

Again, for example, TCI applying component(s) 354 and/or 454 can apply TCI state 3 based on the latest monitoring occasion and lowest CC ID. In other words, in this example, DCI 1, 2, 3, 4, 5 are ACKed by the same PUCCH: based on the current rule, all TCI indications in the DCI can be applied at the same time. DCI3,4 are received last in time; DCI5's reception time is based on the earliest time of the occasion. DCI3 has smaller CC ID than DCI4. DCI3 is selected to determine the TCI, and TCI 3 can be applied. In one example, some of the PUCCHs could include PUCCH repetition, which may impact the BAT for the corresponding TCI state. If the PUCCH repetitions still overlap and result in BAT in the same or similar time period, the rules described herein can still be applied to determine TCI state. For example, DCI 1, 2, 3, 4, 5 in FIG. 9 may be ACKed by different PUCCHs and/or corresponding repetitions, but the PUCCHs may still overlap in time, so DCIs 1-5 can still be considered ACKed at the same time. Overlap in time could mean: (1) overlap in symbol granularity; (2) overlap in slot granularity. For PUCCH repetition, overlap in time can be detected or determined based on any symbol in the repetition, or last repetition, or earliest repetition. Moreover, TCI state can be separately detected or determined for DL only, UL only, or joint DL and UL TCI state indication.

In one example, when the CCs are not in the same CC list, the rule can be applied per CC, among all the DCIs ACKed in the same PUCCH, and TCI applying component(s) 354 and/or 454 can use the last received DCI in time to determine the TCI update (e.g., later received DCI can override earlier received DCI). When multiple DCIs are received at or during the same symbols in the CC, then CORESET ID, SS ID, etc. can be used to receive the DCIs to tiebreak (e.g., to determine the DCI whose TCI update to be applied). For example, DCI with smaller CORESET ID, or smaller SS ID can override other DCIs for applying the corresponding TCI state. When CC0 and CC1 are configured on the same list, however, aspects described herein can apply for cases with PUCCH and PDCCH repetition and/or to determine last received DCI when CCs are with different SCSs.

For example, where CC0 and CC1 are configured on the same list, the TCI update for all CCs in the CC list can be determined as the TCI indicated in a last received DCI among the DCIs lastly ACKed in the same symbol (or slot). For example, the same slot could be in the same PUCCH symbol. In another example, if multiple DCIs are received in a time overlapped with the last received DCI, then TCI applying component(s) 354 and/or 454 can use the CC ID to receive the DCI or the CC ID indicated in the DCI to select the DCI to determine the TCI update. For example, overlapping in time can refer to symbol level overlapping or slot level overlapping (e.g., two DCIs not overlap in the same symbol but in the same slot), partial overlapping as when CCs are with different SCSs, symbols may partially overlap (e.g. half symbol overlap or half slot overlap), and/or the like. In another example, TCI applying component(s) 354 and/or 454 can use a defined priority rule based on CC ID (e.g., smaller/larger CC ID has higher priority). In an example, if multiple DCIs are received in overlapped time, and have the same associated CC ID, TCI applying component(s) 354 and/or 454 can use the CORESET ID to receive the DCI to tiebreak (e.g., to determine the DCI whose TCI update to be applied). Further if multiple DCIs are received in the same CORESET ID, then TCI applying component(s) 354 and/or 454 can use search space ID to further tiebreak (e.g., to determine the DCI whose TCI update to be applied).

Figure 10:
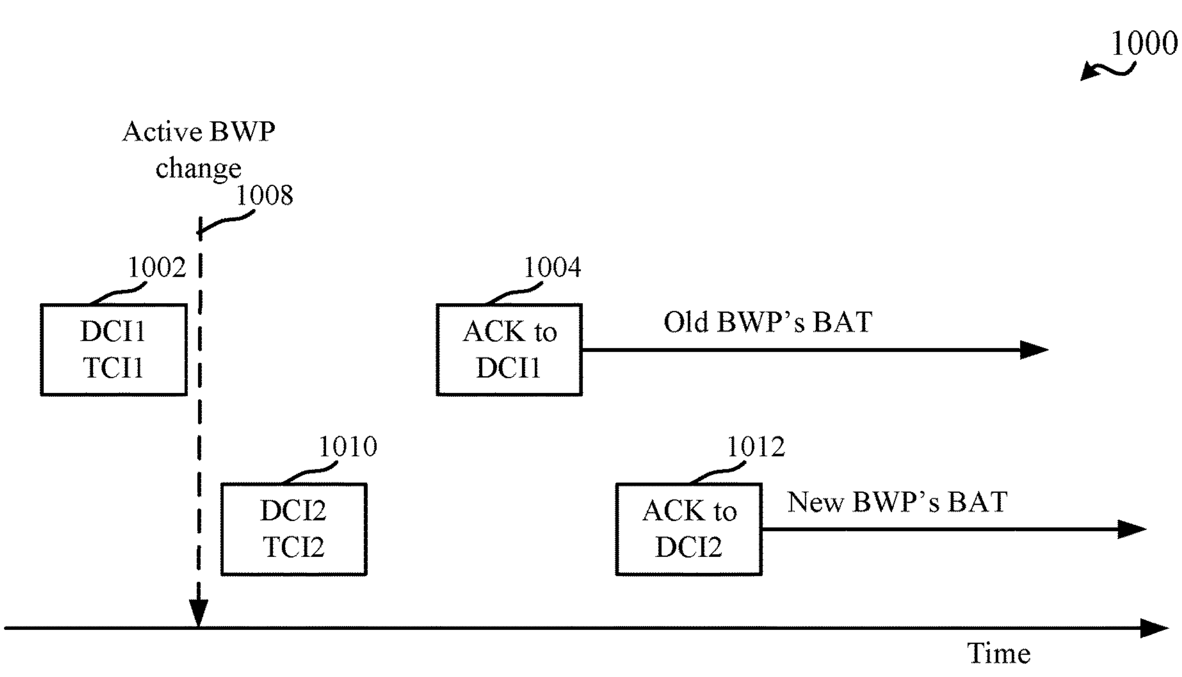
FIG. 10 illustrates an example of a timeline where multiple DCIs with TCI indications or updates are communicated having beam application times (BATs) in different time periods, in accordance with aspects described herein.

FIG. 10 illustrates an example of a timeline 1000 where multiple DCIs with TCI indications or updates are communicated having BATs in different time periods. In timeline 1000, DCI1 1002 can be communicated that includes TCI1 state update or indication. A UE receiving DCI1 1002 can be scheduled to transmit feedback (e.g., based on a k value or other offset from receiving the DCI1 1002) and can transmit ACK to DCI1 at 1004 (e.g., after time k or other offset from receiving the DCI1 1002). The UE can apply TCI1 state after a BAT (shown as old BWP's BAT), which may correspond to a slot. In addition, in timeline 1000, an active BWP change can be received at 1008. For example, the network node can change a BWP for one or more CCs at 1008 using RRC signaling, MAC-CE, DCI, etc. Moreover, in timeline 1000, DCI2 1010 can be communicated that includes TCI2 state update or indication. The UE receiving DCI2 1010 can be scheduled to transmit feedback (e.g., based on a k value or other offset from receiving the DCI2 1010) and can transmit ACK to DCI2 at 1012. The UE can apply TCI2 state after a BAT (shown as new BWP's BAT), which may be due to the BWP change at 1008. In this example, and as described above and further herein, TCI applying component 354 of the UE 104 and/or TCI applying component 454 of the network node can apply either TCI1 state or TCI2 state, for one or more CCs, based on one or more rules, associated parameters, and/or the like.

In one example, an out-of-order (OOO) rule similar to that used for PDCCH, PDSCH, and corresponding ACK order in 5G NR can be used in this scenario. For example, in the OOO rule, a UE can expect that ACK of earlier PDSCH may not come later than ACK of a later PDSCH, and PDSCH scheduled by earlier PDCCH should come no later than PDSCH scheduled by later PDCCH. The network node can ensure the OOO rule is followed. In the example of FIG. 10, an OOO rule can be added for DCI indication, such that the UE may not expect in any CC, that the TCI indicated by a later received DCI takes effect earlier than (or no later than) that indicated by an earlier received DCI, and the network node may ensure the rule is followed. In another example of FIG. 10, the UE can ignore TCI indication which is indicated by a DCI earlier than (or no later than) the DCI corresponding to the current indicated TCI. Examples are explained with reference to FIGS. 11 and 12 below.

Figure 11:
FIG. 11 illustrates a flow chart of an example of a method for ignoring TCI indications indicated by DCI earlier than a DCI corresponding to a current indicated TCI, in accordance with aspects described herein.
Figure 11:
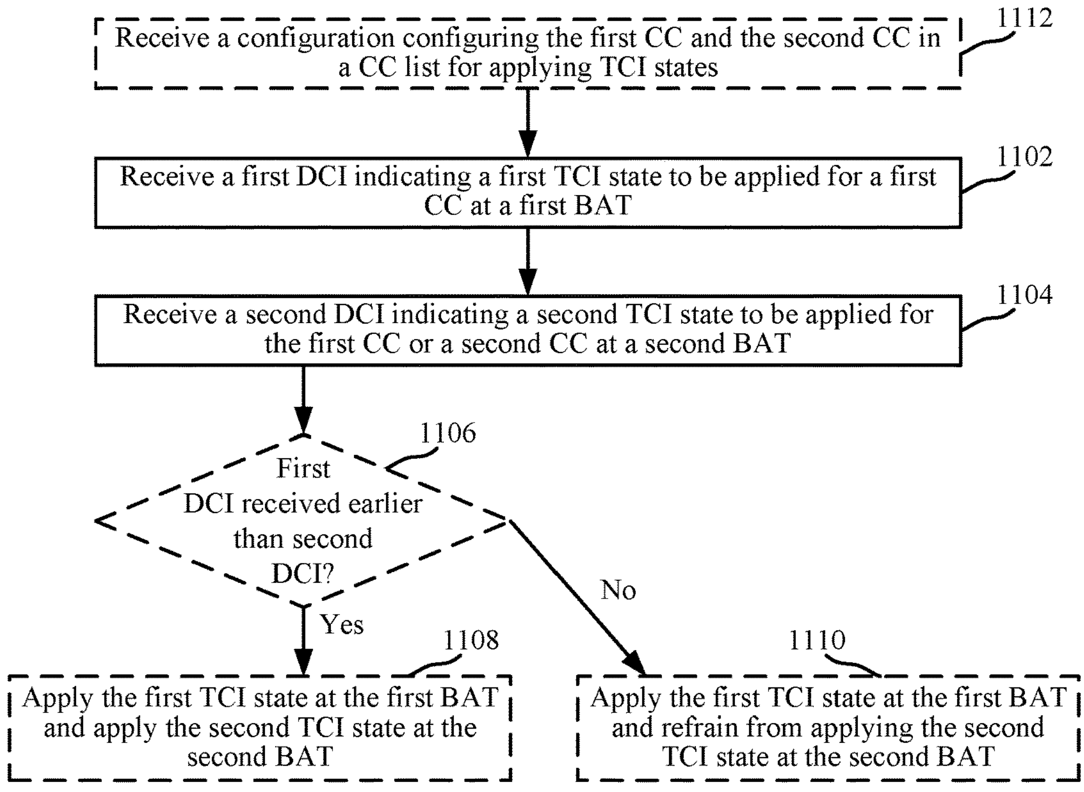

FIG. 11 illustrates a flow chart of an example of a method 1100 for ignoring TCI indications indicated by DCI earlier than a DCI corresponding to a current indicated TCI, in accordance with aspects described herein. In an example, a UE 104 can perform the functions described in method 1100 using one or more of the components described in FIGS. 1 and 3.

In method 1100, at Block 1102, a first DCI indicating a first TCI state to be applied for a first CC at a first BAT can be received. In an aspect, DCI processing component 352, e.g., in conjunction with processor(s) 312, memory/memories 316, transceiver 302, UE communicating component 342, etc., can receive the first DCI indicating the first TCI state to be applied for the first CC in the first BAT. For example, this can be similar to Block 502 of method 500 in FIG. 5 described above.

In method 1100, at Block 1104, a second DCI indicating a second TCI state to be applied for the first CC or a second CC at a second BAT can be received. In an aspect, DCI processing component 352, e.g., in conjunction with processor(s) 312, memory/memories 316, transceiver 302, UE communicating component 342, etc., can receive the second DCI indicating the second TCI state to be applied for the first CC or the second CC in the second BAT. For example, this can be similar to Block 504 of method 500 in FIG. 5 described above, except that the second BAT may be in a different time period than the first BAT (e.g., a different slot), as shown in FIG. 10 for example.

In method 1100, optionally at Block 1106, it can be determined whether the first DCI is received earlier than the second DCI. In an aspect, TCI applying component 354, e.g., in conjunction with processor(s) 312, memory/memories 316, transceiver 302, UE communicating component 342, etc., can determine whether the first DCI is received earlier than the second DCI. If so, in method 1100, optionally at Block 1108, the first TCI state can be applied at the first BAT and the second TCI state can be applied at the second BAT. In an aspect, TCI applying component 354, e.g., in conjunction with processor(s) 312, memory/memories 316, transceiver 302, UE communicating component 342, etc., can apply the first TCI state at the first BAT (e.g., for the first CC and/or second CC) and can apply the second TCI state at the second BAT (e.g., for the first and/or second CC).

If the first DCI is not received earlier than the second DCI at Block 1106, optionally, at Block 1110, the first TCI state can be applied at the first BAT and the second TCI state can be refrained from being applied at the second BAT. In an aspect, TCI applying component 354, e.g., in conjunction with processor(s) 312, memory/memories 316, transceiver 302, UE communicating component 342, etc., can apply the first TCI state at the first BAT (e.g., for the first CC and/or second CC) and refrain from applying the second TCI state at the second BAT (e.g., for the first and/or second CC). This can be because the UE does not expect to receive the second DCI after receiving the first DCI (and before the first TCI state is applied).

In method 1100, optionally at Block 1112, a configuration configurating the first CC and the second CC in a CC list for applying the TCI states can be received. In an aspect, UE communicating component 342, e.g., in conjunction with processor(s) 312, memory/memories 316, transceiver 302, etc., can receive the configuration configuring the first CC and the second CC in the CC list for applying TCI states. For example, UE communicating component 342 can receive the configuration using RRC signaling, MAC-CE, DCI, etc. and configure multiple CCs in a CC list, where the CC list can relate to applying the same TCI state for the CCs. In this regard, when the network node configures a TCI state for one CC (e.g., in a DCI received over, or otherwise indicating, the one CC), TCI applying component 354 can apply the TCI state to the one CC and any other CCs in a same CC list as the one CC.

Figure 12:
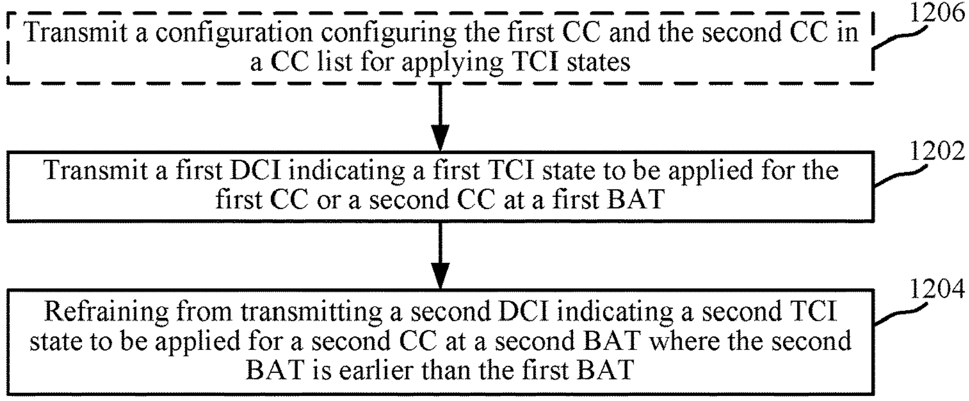
FIG. 12 illustrates a flow chart of an example of a method for refraining from transmitting TCI indications indicated by DCI earlier than a DCI corresponding to a current indicated TCI, in accordance with aspects described herein.

FIG. 12 illustrates a flow chart of an example of a method 1200 for refraining from transmitting TCI indications indicated by DCI earlier than a DCI corresponding to a current indicated TCI, in accordance with aspects described herein. In an example, a base station 102 (e.g., a gNB, a monolithic base station, a portion of a disaggregated base station, etc.) can perform the functions described in method 1200 using one or more of the components described in FIGS. 1 and 4.

In method 1200, at Block 1202, a first DCI indicating a first TCI state to be applied for a first CC at a first BAT can be transmitted. In an aspect, DCI component 452, e.g., in conjunction with processor(s) 412, memory/memories 416, transceiver 402, BS communicating component 442, etc., can transmit the first DCI indicating the first TCI state to be applied for the first CC in the first BAT. For example, this can be similar to Block 602 of method 600 in FIG. 6 described above.

In method 1200, at Block 1204, transmitting a second DCI indicating a second TCI state to be applied for the first CC or a second CC at a second BAT can be refrained from where the second BAT is earlier than the first BAT. In an aspect, DCI component 452, e.g., in conjunction with processor(s) 412, memory/memories 416, transceiver 402, BS communicating component 442, etc., can refrain from transmitting the second DCI indicating the second TCI state to be applied for the first CC or the second CC in the second BAT where the second BAR is earlier than the first BAT.

In method 1200, optionally at Block 1206, a configuration configurating the first CC and the second CC in a CC list for applying the TCI states can be transmitted. In an aspect, BS communicating component 442, e.g., in conjunction with processor(s) 412, memory/memories 416, transceiver 402, etc., can transmit (e.g., for the UE 104) the configuration configuring the first CC and the second CC in the CC list for applying TCI states. For example, BS communicating component 442 can transmit the configuration using RRC signaling, MAC-CE, DCI, etc. and configure multiple CCs in a CC list, where the CC list can relate to applying the same TCI state for the CCs. In this regard, when the network node configures a TCI state for one CC (e.g., in a DCI received over, or otherwise indicating, the one CC), this can indicate to apply the TCI state to the one CC and any other CCs in a same CC list as the one CC.

Figure 13:
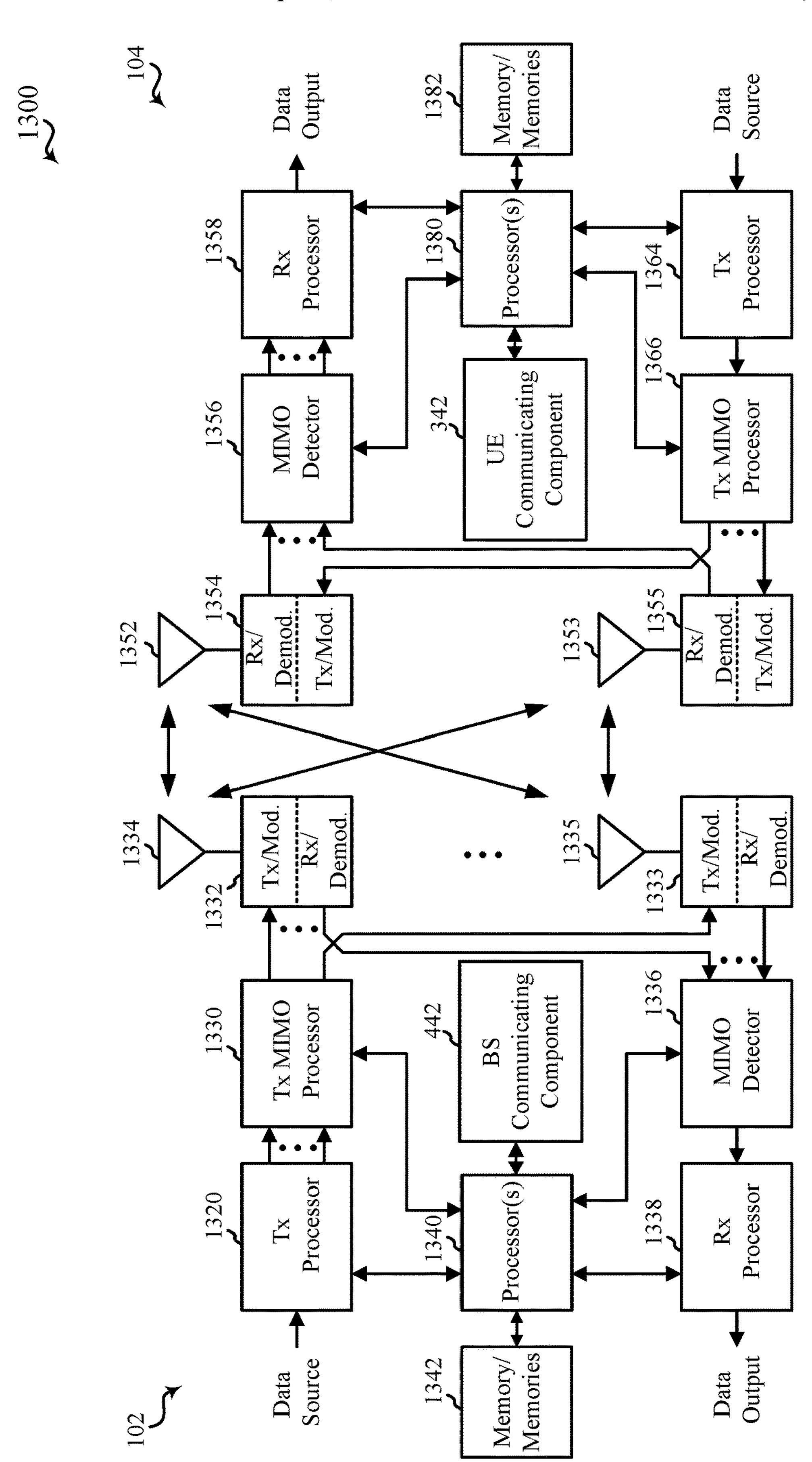
FIG. 13 is a block diagram illustrating an example of a multiple-input multiple-output (MIMO) communication system including a base station and a UE, in accordance with various aspects of the present disclosure.

FIG. 13 is a block diagram of a MIMO communication system 1300 including a base station 102 and a UE 104. The MIMO communication system 1300 may illustrate aspects of the wireless communication access network 100 described with reference to FIG. 1. The base station 102 may be an example of aspects of the base station 102 described with reference to FIG. 1. The base station 102 may be equipped with antennas 1334 and 1335, and the UE 104 may be equipped with antennas 1352 and 1353. In the MIMO communication system 1300, the base station 102 may be able to send data over multiple communication links at the same time. Each communication link may be called a “layer” and the “rank” of the communication link may indicate the number of layers used for communication. For example, in a 2×2 MIMO communication system where base station 102 transmits two “layers,” the rank of the communication link between the base station 102 and the UE 104 is two.

At the base station 102, a transmit (Tx) processor 1320 may receive data from a data source. The transmit processor 1320 may process the data. The transmit processor 1320 may also generate control symbols or reference symbols. A transmit MIMO processor 1330 may perform spatial processing (e.g., precoding) on data symbols, control symbols, or reference symbols, if applicable, and may provide output symbol streams to the transmit modulator/demodulators 1332 and 1333. Each modulator/demodulator 1332 through 1333 may process a respective output symbol stream (e.g., for OFDM, etc.) to obtain an output sample stream. Each modulator/demodulator 1332 through 1333 may further process (e.g., convert to analog, amplify, filter, and upconvert) the output sample stream to obtain a DL signal. In one example, DL signals from modulator/demodulators 1332 and 1333 may be transmitted via the antennas 1334 and 1335, respectively.

The UE 104 may be an example of aspects of the UEs 104 described with reference to FIGS. 1 and 3. At the UE 104, the UE antennas 1352 and 1353 may receive the DL signals from the base station 102 and may provide the received signals to the modulator/demodulators 1354 and 1355, respectively. Each modulator/demodulator 1354 through 1355 may condition (e.g., filter, amplify, downconvert, and digitize) a respective received signal to obtain input samples. Each modulator/demodulator 1354 through 1355 may further process the input samples (e.g., for OFDM, etc.) to obtain received symbols. A MIMO detector 1356 may obtain received symbols from the modulator/demodulators 1354 and 1355, perform MIMO detection on the received symbols, if applicable, and provide detected symbols. A receive (Rx) processor 1358 may process (e.g., demodulate, deinterleave, and decode) the detected symbols, providing decoded data for the UE 104 to a data output, and provide decoded control information to a processor(s) 1380, or memory/memories 1382.

The processor(s) 1380 may in some cases execute stored instructions to instantiate a UE communicating component 342 (see e.g., FIGS. 1 and 3).

On the uplink (UL), at the UE 104, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the modulator/demodulators 1354 and 1355 (e.g., for single carrier-FDMA, etc.), and be transmitted to the base station 102 in accordance with the communication parameters received from the base station 102. At the base station 102, the UL signals from the UE 104 may be received by the antennas 1334 and 1335, processed by the modulator/demodulators 1332 and 1333, detected by a MIMO detector 1336 if applicable, and further processed by a receive processor 1338. The receive processor 1338 may provide decoded data to a data output and to the processor(s) 1340 or memory/memories 1342.

The processor(s) 1340 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1300. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1300.

The following aspects are illustrative only and aspects thereof may be combined with aspects of other embodiments or teaching described herein, without limitation.

Aspect 1 a method for wireless communication at a UE including receiving a first DCI indicating a first TCI state to be applied for a first CC at a first BAT, receiving a second DCI indicating a second TCI state to be applied for the first CC or a second CC at a second BAT, and where the first BAT and the second BAT are within a same time period, applying the first TCI state or the second TCI state for one or more of the first CC or the second CC within the time period based at least in part on a first property of the first DCI and a second property of the second DCI.

In Aspect 2, the method of Aspect 1 includes wherein the first property includes a first monitoring occasion associated with the first DCI and the second property includes a second monitoring occasion associated with the second DCI.

In Aspect 3, the method of Aspect 2 includes wherein applying the first TCI state or the second TCI state includes applying the first TCI state where the first monitoring occasion is later than the second monitoring occasion.

In Aspect 4, the method of any of Aspects 1 to 3 includes wherein the first property includes a first CC ID associated with the first DCI and the second property includes a second CC ID associated with the second DCI.

In Aspect 5, the method of Aspect 4 includes wherein applying the first TCI state or the second TCI state includes applying the first TCI state based on the first CC ID and the second CC ID where a first monitoring occasion of the first DCI is within or at least partially overlaps a second monitoring occasion of the second DCI in time.

In Aspect 6, the method of Aspect 5 includes wherein the first DCI and the second DCI do not include a downlink channel assignment.

In Aspect 7, the method of any of Aspects 1 to 6 includes wherein the first property includes a first BWP ID associated with the first DCI and the second property includes a second BWP ID associated with the second DCI.

In Aspect 8, the method of any of Aspects 1 to 7 includes wherein the first property includes a first ACK time associated with the first DCI and the second property includes a second ACK time associated with the second DCI.

In Aspect 9, the method of any of Aspects 1 to 8 includes wherein the first property includes a first BWP ID associated with the first DCI and the second property includes a second BWP ID associated with the second DCI.

In Aspect 10, the method of any of Aspects 1 to 9 includes wherein the first property includes a first CORESET ID associated with the first DCI and the second property includes a second CORESET ID associated with the second DCI.

In Aspect 11, the method of any of Aspects 1 to 10 includes wherein the first property includes a first SS set ID associated with the first DCI and the second property includes a second SS set ID associated with the second DCI.

In Aspect 12, the method of any of Aspects 1 to 11 includes wherein the first property includes a set of multiple first monitoring occasions associated with the first DCI and the second property includes at least one second monitoring occasion associated with the second DCI, wherein applying the first TCI state or the second TCI state is based on one of the set of multiple first monitoring occasions and the at least one second monitoring occasion.

In Aspect 13, the method of Aspect 12 includes wherein the one of the set of multiple first monitoring occasions includes one of an earliest one of the set of multiple first monitoring occasions, a latest one of the set of multiple first monitoring occasions, or a latest one in a earliest repetition of the first DCI in the set of multiple first monitoring occasions.

In Aspect 14, the method of any of Aspects 1 to 13 includes transmitting a first ACK for the first DCI and a second ACK for the second DCI.

In Aspect 15, the method of Aspect 14 includes wherein applying the first TCI state or the second TCI state is further based on transmitting the first ACK and the second ACK in a same feedback time period.

In Aspect 16, the method of any of Aspects 1 to 15 includes wherein the first property includes a first time at which the first DCI is received and a second time at which the second DCI is received.

In Aspect 17, the method of any of Aspects 1 to 16 includes wherein, where the first DCI and the second DCI are received within the same or partially overlapping DCI time, the first property includes a first CORESET ID or a first SS set ID associated with the first DCI and the second property includes a second CORESET ID or a second SS ID associated with the second DCI.

In Aspect 18, the method of any of Aspects 1 to 17 includes wherein applying the first TCI state or the second TCI state within the time period includes applying the first TCI state or the second TCI state as one of an uplink TCI state, a downlink TCI state, or a unified uplink and downlink TCI state.

In Aspect 19, the method of any of Aspects 1 to 18 includes receiving a configuration configuring the first CC and the second CC in a CC list for applying TCI states.

In Aspect 20, the method of Aspect 19 includes wherein applying the first TCI state or the second TCI state includes applying the first TCI state or the second TCI state to all CCs in the CC list.

Aspect 21 is a method for wireless communication at a network node including transmitting a first DCI indicating a first TCI state to be applied for a first CC at a first BAT, transmitting a second DCI indicating a second TCI state to be applied for the first CC or a second CC at a second BAT, and where the first BAT and the second BAT are within a same time period, applying the first TCI state or the second TCI state for one or more of the first CC or the second CC within the time period based at least in part on a first property of the first DCI and a second property of the second DCI.

In Aspect 22, the method of Aspect 21 includes wherein the first property includes a first monitoring occasion associated with the first DCI and the second property includes a second monitoring occasion associated with the second DCI.

In Aspect 23, the method of Aspect 22 includes wherein applying the first TCI state or the second TCI state includes applying the first TCI state where the first monitoring occasion is later than the second monitoring occasion.

In Aspect 24, the method of any of Aspects 21 to 23 includes wherein the first property includes a first CC ID associated with the first DCI and the second property includes a second CC ID associated with the second DCI.

In Aspect 25, the method of Aspect 24 includes wherein applying the first TCI state or the second TCI state includes applying the first TCI state based on the first CC ID and the second CC ID where a first monitoring occasion of the first DCI is within or at least partially overlaps a second monitoring occasion of the second DCI in time.

In Aspect 26, the method of Aspect 25 includes wherein the first DCI and the second DCI do not include a downlink channel assignment.

In Aspect 27, the method of any of Aspects 21 to 26 includes wherein the first property includes a first BWP ID associated with the first DCI and the second property includes a second BWP ID associated with the second DCI.

In Aspect 28, the method of any of Aspects 21 to 27 includes wherein the first property includes a first ACK time associated with the first DCI and the second property includes a second ACK time associated with the second DCI.

In Aspect 29, the method of any of Aspects 21 to 28 includes wherein the first property includes a first BWP ID associated with the first DCI and the second property includes a second BWP ID associated with the second DCI.

In Aspect 30, the method of any of Aspects 21 to 29 includes wherein the first property includes a first CORESET ID associated with the first DCI and the second property includes a second CORESET ID associated with the second DCI.

In Aspect 31, the method of any of Aspects 21 to 30 includes wherein the first property includes a first SS set ID associated with the first DCI and the second property includes a second SS set ID associated with the second DCI.

In Aspect 32, the method of any of Aspects 21 to 31 includes wherein the first property includes a set of multiple first monitoring occasions associated with the first DCI and the second property includes at least one second monitoring occasion associated with the second DCI, wherein applying the first TCI state or the second TCI state is based on one of the set of multiple first monitoring occasions and the at least one second monitoring occasion.

In Aspect 33, the method of Aspect 32 includes wherein the one of the set of multiple first monitoring occasions includes one of an earliest one of the set of multiple first monitoring occasions, a latest one of the set of multiple first monitoring occasions, or a latest one in a earliest repetition of the first DCI in the set of multiple first monitoring occasions.

In Aspect 34, the method of any of Aspects 21 to 33 includes receiving a first ACK for the first DCI and a second ACK for the second DCI.

In Aspect 35, the method of Aspect 34 includes wherein applying the first TCI state or the second TCI state is further based on scheduling resources for receiving the first ACK and the second ACK in a same feedback time period.

In Aspect 36, the method of any of Aspects 21 to 35 includes wherein the first property includes a first time at which the first DCI is transmitted and a second time at which the second DCI is transmitted.

In Aspect 37, the method of any of Aspects 21 to 36 includes wherein, where the first DCI and the second DCI are transmitted within the same or partially overlapping DCI time, the first property includes a first CORESET ID or a first SS set ID associated with the first DCI and the second property includes a second CORESET ID or a second SS ID associated with the second DCI.

In Aspect 38, the method of any of Aspects 21 to 37 includes wherein applying the first TCI state or the second TCI state within the time period includes applying the first TCI state or the second TCI state as one of an uplink TCI state, a downlink TCI state, or a unified uplink and downlink TCI state.

In Aspect 39, the method of any of Aspects 21 to 38 includes transmitting a configuration configuring the first CC and the second CC in a CC list for applying TCI states.

In Aspect 40, the method of Aspect 39 includes wherein applying the first TCI state or the second TCI state includes applying the first TCI state or the second TCI state to all CCs in the CC list.

Aspect 41 is a method for wireless communication at a UE including receiving a first (DCI) indicating a first TCI state to be applied for a first CC at a first BAT, receiving a second DCI indicating a second TCI state to be applied for the first CC or a second CC at a second BAT, where the first BAT is earlier, in time, than the second BAT, where the first DCI is received earlier than the second DCI, applying the first TCI state at the first BAT and applying the second TCI state at the second BAT, and where the second DCI is received earlier than the first DCI, applying the first TCI state at the first BAT and refraining from applying the second TCI state at the second BAT.

In Aspect 42, the method of Aspect 41 includes receiving a configuration configuring the first CC and the second CC in a CC list for applying TCI states.

Aspect 43 is a method for wireless communication at a network node including transmitting a first DCI indicating a first TCI state to be applied for a first CC at a first BAT, and refraining from transmitting, after the first DCI, a second DCI indicating a second TCI state to be applied for the first CC or a second CC at a second BAT, where the second BAT is earlier than the first BAT.

In Aspect 44, the method of Aspect 43 includes transmitting a configuration configuring the first CC and the second CC in a CC list for applying TCI states.

Aspect 45 is an apparatus for wireless communication including one or more processors, one or more memories coupled with the one or more processors, and instructions stored in the one or more memories and operable, when executed by the one or more processors, to cause the apparatus to perform any of the methods of Aspects 1 to 44.

Aspect 46 is an apparatus for wireless communication including means for performing any of the methods of Aspects 1 to 44.

Aspect 47 is one or more computer-readable media including code executable by one or more processors for wireless communications, the code including code for performing any of the methods of Aspects 1 to 44.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

receive a configuration configuring a first component carrier (CC) and a second CC in a CC list for applying TCI states;

receive a first downlink control information (DCI) indicating a first transmission configuration indicator (TCI) state to be applied for the first CC at a first beam applying time (BAT);

receive a second DCI indicating a second TCI state to be applied for the first CC or the second CC at a second BAT; and where the first BAT and the second BAT are within a same time period, apply one of the first TCI state or the second TCI state for all CCs in the CC list including the first CC and the second CC, within the time period based at least in part on a first property of the first DCI and a second property of the second DCI.

2. The apparatus of claim 1, wherein the first property includes a first monitoring occasion associated with the first DCI and the second property includes a second monitoring occasion associated with the second DCI.

3. The apparatus of claim 2, wherein the one or more processors are, individually or in combination, configured to execute the instructions to cause the apparatus to apply the first TCI state where the first monitoring occasion is later than the second monitoring occasion.

4. The apparatus of claim 1, wherein the first property includes a first component carrier (CC) identifier (ID) associated with the first DCI and the second property includes a second CC ID associated with the second DCI.

5. The apparatus of claim 4, wherein the one or more processors are, individually or in combination, configured to execute the instructions to cause the apparatus to apply the first TCI state based on the first CC ID and the second CC ID where a first monitoring occasion of the first DCI is within or at least partially overlaps a second monitoring occasion of the second DCI in time.

6. The apparatus of claim 5, wherein the first DCI and the second DCI do not include a downlink channel assignment.

7. The apparatus of claim 1, wherein the first property includes a first bandwidth part (BWP) identifier (ID) associated with the first DCI and the second property includes a second BWP ID associated with the second DCI.

8. The apparatus of claim 1, wherein the first property includes a first acknowledgement (ACK) time associated with the first DCI and the second property includes a second ACK time associated with the second DCI.

9. The apparatus of claim 1, wherein the first property includes a first control resource set (CORESET) identifier (ID) associated with the first DCI and the second property includes a second CORESET ID associated with the second DCI.

10. The apparatus of claim 1, wherein the first property includes a first search space (SS) set identifier (ID) associated with the first DCI and the second property includes a second SS set ID associated with the second DCI.

11. The apparatus of claim 1, wherein the first property includes a set of multiple first monitoring occasions associated with the first DCI and the second property includes at least one second monitoring occasion associated with the second DCI, wherein the one or more processors are, individually or in combination, configured to execute the instructions to cause the apparatus to apply the first TCI state or the second TCI state based on one of the set of multiple first monitoring occasions and the at least one second monitoring occasion.

12. The apparatus of claim 11, wherein the one of the set of multiple first monitoring occasions includes one of:

an earliest one of the set of multiple first monitoring occasions;

a latest one of the set of multiple first monitoring occasions; or a latest one in a earliest repetition of the first DCI in the set of multiple first monitoring occasions.

13. The apparatus of claim 1, wherein the one or more processors are, individually or in combination, configured to execute the instructions to cause the apparatus to transmit a first acknowledgement (ACK) for the first DCI and a second ACK for the second DCI.

14. The apparatus of claim 13, wherein the one or more processors are, individually or in combination, configured to execute the instructions to cause the apparatus to apply the first TCI state or the second TCI state further based on transmitting the first ACK and the second ACK in a same feedback time period.

15. The apparatus of claim 1, wherein the first property includes a first time at which the first DCI is received and a second time at which the second DCI is received, and wherein the one or more processors are, individually or in combination, configured to execute the instructions to cause the apparatus to apply the first TCI state for all CCs in the CC list based on the first time occurring after the second time.

16. The apparatus of claim 1, wherein, where the first DCI and the second DCI are received within the same or partially overlapping DCI time, the first property includes a first control resource set (CORESET) identifier (ID) or a first search space (SS) set ID associated with the first DCI and the second property includes a second CORESET ID or a second SS ID associated with the second DCI.

17. The apparatus of claim 1, wherein the one or more processors are, individually or in combination, configured to execute the instructions to cause the apparatus to apply the first TCI state or the second TCI state within the time period as one of an uplink TCI state, a downlink TCI state, or a unified uplink and downlink TCI state.

18. An apparatus for wireless communication, comprising:

a transceiver;

one or more memories configured to, individually or in combination, store instructions; and one or more processors communicatively coupled with the one or more memories, wherein the one or more processors are, individually or in combination, configured to execute the instructions to cause the apparatus to:

transmit a configuration configuring a first component carrier (CC) and a second CC in a CC list for applying TCI states;

transmit a first downlink control information (DCI) indicating a first transmission configuration indicator (TCI) state to be applied for the first CC at a first beam applying time (BAT);

transmit a second DCI indicating a second TCI state to be applied for the first CC or the second CC at a second BAT; and where the first BAT and the second BAT are within a same time period, apply one of the first TCI state or the second TCI state for all CCs in the CC list including the first CC and the second CC within the time period based at least in part on a first property of the first DCI and a second property of the second DCI.

19. The apparatus of claim 18, wherein the first property includes a first monitoring occasion associated with the first DCI and the second property includes a second monitoring occasion associated with the second DCI.

20. The apparatus of claim 19, wherein the one or more processors are, individually or in combination, configured to execute the instructions to cause the apparatus to apply the first TCI state where the first monitoring occasion is later than the second monitoring occasion.

21. The apparatus of claim 18, wherein the first property includes a first component carrier (CC) identifier (ID) associated with the first DCI and the second property includes a second CC ID associated with the second DCI.

22. The apparatus of claim 21, wherein the one or more processors are, individually or in combination, configured to execute the instructions to cause the apparatus to apply the first TCI state based on the first CC ID and the second CC ID where a first monitoring occasion of the first DCI is within or at least partially overlaps a second monitoring occasion of the second DCI in time.

23. The apparatus of claim 18, wherein the first property includes a set of multiple first monitoring occasions associated with the first DCI and the second property includes at least one second monitoring occasion associated with the second DCI, wherein the one or more processors are, individually or in combination, configured to execute the instructions to cause the apparatus to apply the first TCI state or the second TCI state based on one of the set of multiple first monitoring occasions and the at least one second monitoring occasion.

24. A method for wireless communication at a user equipment (UE), comprising:

receiving a configuration configuring a first component carrier (CC) and a second CC in a CC list for applying TCI states;

receiving a first downlink control information (DCI) indicating a first transmission configuration indicator (TCI) state to be applied for the first CC at a first beam applying time (BAT);

receiving a second DCI indicating a second TCI state to be applied for the first CC or the second CC at a second BAT; and where the first BAT and the second BAT are within a same time period, applying one of the first TCI state or the second TCI state for all CCs in the CC list including one or more of the first CC and the second CC within the time period based at least in part on a first property of the first DCI and a second property of the second DCI.

25. The method of claim 24, wherein the first property includes a first monitoring occasion associated with the first DCI and the second property includes a second monitoring occasion associated with the second DCI.

26. A method for wireless communication at a network node, comprising:

transmitting a configuration configuring a first component carrier (CC) and a second CC in a CC list for applying TCI states;

transmitting a first downlink control information (DCI) indicating a first transmission configuration indicator (TCI) state to be applied for the first CC at a first beam applying time (BAT);

transmitting a second DCI indicating a second TCI state to be applied for the first CC or the second CC at a second BAT; and where the first BAT and the second BAT are within a same time period, applying one of the first TCI state or the second TCI state for all CCs in the CC list including the first CC and the second CC within the time period based at least in part on a first property of the first DCI and a second property of the second DCI.

27. The method of claim 26, wherein the first property includes a first monitoring occasion associated with the first DCI and the second property includes a second monitoring occasion associated with the second DCI.

28. The method of claim 24, wherein applying the first TCI state or the second TCI state includes applying the first TCI state for all CCs in the CC list where the first monitoring occasion is later than the second monitoring occasion.

29. The method of claim 24, wherein the first property includes a first control resource set (CORESET) identifier (ID) associated with the first DCI and the second property includes a second CORESET ID associated with the second DCI.

30. The method of claim 29, wherein applying the first TCI state or the second TCI state includes applying the first TCI state for all CCs in the CC list where the first CORESET ID is less than the second CORESET ID.

* * * * *